United States Patent
Hertzmann et al.

(10) Patent No.: US 12,536,715 B2
(45) Date of Patent: Jan. 27, 2026

(54) GENERATION OF STYLIZED DRAWING OF THREE-DIMENSIONAL SHAPES USING NEURAL NETWORKS

(71) Applicants: Adobe Inc., San Jose, CA (US); University of Massachusetts, Boston, MA (US)

(72) Inventors: Aaron Hertzmann, San Francisco, CA (US); Matthew Fisher, Burlingame, CA (US); Difan Liu, Amherst, MA (US); Evangelos Kalogerakis, Sunderland, MA (US)

(73) Assignees: Adobe Inc., San Jose, CA (US); University of Massachusetts, Boston, MA (US)

( * ) Notice: Subject to any disclaimer, the term of this patent is extended or adjusted under 35 U.S.C. 154(b) by 213 days.

(21) Appl. No.: 18/419,287

(22) Filed: Jan. 22, 2024

(65) Prior Publication Data
US 2024/0161355 A1    May 16, 2024

Related U.S. Application Data

(62) Division of application No. 17/452,568, filed on Oct. 27, 2021, now Pat. No. 11,880,913.

(30) Foreign Application Priority Data

Oct. 11, 2021 (GR) .............................. 20210100690

(51) Int. Cl.
*G06T 11/00* (2006.01)
*G06N 3/045* (2023.01)
*G06T 11/20* (2006.01)

(52) U.S. Cl.
CPC ............ *G06T 11/001* (2013.01); *G06N 3/045* (2023.01); *G06T 11/203* (2013.01); *G06T 2200/04* (2013.01)

(58) Field of Classification Search
None
See application file for complete search history.

(56) References Cited

U.S. PATENT DOCUMENTS

| 11,880,913 B2 | 1/2024 | Hertzmann et al. |
| 2020/0050736 A1* | 2/2020 | Shayani ................. G06N 3/088 |

(Continued)

OTHER PUBLICATIONS

Bénard, P., et al., "Line Drawings from 3D Models: A Tutorial," Preprint, May 13, 2019, 126 pages, URL: https://arxiv.org/abs/1810.01175v2.

(Continued)

*Primary Examiner* — Sarah Le
(74) *Attorney, Agent, or Firm* — Weaver Austin Villeneuve & Sampson LLP

(57) ABSTRACT

Techniques for generating a stylized drawing of three-dimensional (3D) shapes using neural networks are disclosed. A processing device generates a set of vector curve paths from a viewpoint of a 3D shape; extracts, using a first neural network of a plurality of neural networks of a machine learning model, surface geometry features of the 3D shape based on geometric properties of surface points of the 3D shape; determines, using a second neural network of the plurality of neural networks of the machine learning model, a set of at least one predicted stroke attribute based on the surface geometry features and a predetermined drawing style; generates, based on the at least one predicted stroke attribute, a set of vector stroke paths corresponding to the set of vector curve paths; and outputs a two-dimensional (2D) stylized stroke drawing of the 3D shape based at least on the set of vector stroke paths.

20 Claims, 11 Drawing Sheets

(56) References Cited

U.S. PATENT DOCUMENTS

2020/0151938 A1    5/2020    Shechtman et al.
2020/0151963 A1*   5/2020    Lee ..................... G06N 3/0464

OTHER PUBLICATIONS

Bénard, P., et al., "Stylizing Animation by Example," ACM Trans. Graph., Jul. 2013, vol. 32(4), Article 119, pp. 1-12, DOI: 10.1145/2461912.2461929.

Cole, F., et al., "How Well Do Line Drawings Depict Shape?" Proc. SIGGRAPH, ACM Trans. Graph., Jul. 2009, vol. 28(3), pp. 1-9, DOI: 10.1145/1576246.1531334.

Coleman, P., et al., "Making Souls: Methods and a Pipeline for Volumetric Characters," SIGGRAPH '20: ACM SIGGRAPH 2020 Talks, Aug. 2020, Article 28, pp. 1-2, DOI: 10.1145/3388767.3407361.

Decarlo, D., "Depicting 3D shape using lines," Proc. of the SPIE: Human Vision and Electronic Imaging XVII, Feb. 20, 2012, vol. 8291, 829116, pp. 1-16, DOI: 10.1117/12.916463.

Decarlo, D., et al., "Suggestive Contours for Conveying Shape," ACM SIGGRAPH 2003 Papers, Jul. 2003, pp. 848-855, DOI: 10.1145/1201775.882354.

Fankbonner, Edgar Loy, Art of Drawing the Human Body, New York, NY: Sterling Publishing Co., Inc., 2004, 162 pages.

Fišer, J., et al., "StyLit: Illumination-Guided Example-Based Stylization of 3D Renderings," Proc. SIGGRAPH '16, ACM Trans. Graph., Jul. 2016, vol. 35(4), Article 92, pp. 1-11, DOI: 10.1145/2897824.2925948.

Fish, N., et al., "SketchPatch: Sketch Stylization via Seamless Patch-level Synthesis," ACM Trans. Graph., Dec. 2020, vol. 39(6), Article 227, pp. 1-14, URL: https://arxiv.org/abs/2009.02216v1.

Ganin, Y., et al., "Synthesizing Programs for Images using Reinforced Adversarial Learning," Proc. 35th International Conference on Machine Learning (ICML), 2018, 12 pages, URL: https://arxiv.org/abs/1804.01118v1.

Gatys, L. A., et al., "Image Style Transfer Using Convolutional Neural Networks," Proc. IEEE Conference on Computer Vision and Pattern Recognition (CVPR), 2016, pp. 2414-2423, DOI: 10.1109/CVPR.2016.265.

Goodwin, T., et al., "Isophote Distance: A Shading Approach to Artistic Stroke Thickness," Proc. 5th International Symposium on Non-Photorealistic Animation and Rendering (NPAR), Aug. 2007, pp. 53-62, DOI: 10.1145/1274871.1274880.

Grabli, S., et al., "Programmable Rendering of Line Drawing from 3D Scenes," ACM Trans. Graph., Mar. 2010, vol. 29(2), Article 18, pp. 1-20, DOI: 10.1145/1731047.1731056.

Gryaditskaya, Y., et al., "Lifting Freehand Concept Sketches into 3D," ACM Trans. Graph., Dec. 2020, vol. 39(6), Article 167, pp. 1-16, DOI: 10.1145/3414685.3417851.

Hertzmann, A., et al., "Curve Analogies," EGRW '02: Proc. Thirteenth Eurographics Workshop on Rendering, The Eurographics Association, 2002, pp. 1-13.

Hertzmann, A., et al., "Image Analogies," SIGGRAPH '01: Proc. 28th Annual Conference on Computer Graphics and Interactive Techniques, Aug. 2001, pp. 327-340, DOI: 10.1145/383259.383295.

Hertzmann, A., "Why Do Line Drawings Work? A Realism Hypothesis," Preprint accepted to Perception, 2020, vol. 49(4), 13 pages, URL: https://arxiv.org/abs/2002.06260v1.

Heusel, M., et al., "GANs Trained by a Two Time-Scale Update Rule Converge to a Local Nash Equilibrium," Advances in Neural Information Processing Systems 30 (NIPS 2017), Jan. 12, 2018, pp. 1-38, URL: https://arxiv.org/abs/1706.08500v6.

Huang, X., et al., "Arbitrary Style Transfer in Real-time with Adaptive Instance Normalization", Proc. 2017 IEEE International Conference on Computer Vision (ICCV), 2017, 10 pages, DOI: 10.1109/ICCV.2017.167.

Huang, Z., et al., "Learning to Paint With Model-based Deep Reinforcement Learning," Proc. 2019 IEEE/CVF International Conference on Computer Vision (ICCV), 2019, 10 pages.

Isola, P., et al., "Image-to-Image Translation with Conditional Adversarial Networks," Proc. 2017 IEEE Conference on Computer Vision and Pattern Recognition (CVPR), 2017, 10 pages, DOI: 10.1109/CVPR.2017.632.

Johnson, J., et al., "Perceptual Losses for Real-Time Style Transfer and Super-Resolution," Proc. 14th European Conference on Computer Vision (ECCV 2016), In: Leibe B., Matas J., Sebe N., Welling M. (eds) Computer Vision—ECCV 2016. Lecture Notes in Computer Science, 2016, vol. 9906. Springer, Cham., 17 pages, DOI: 10.1007/978-3-319-46475-6_43.

Judd, T., et al., "Apparent Ridges for Line Drawing," ACM Trans. Graph., Jul. 2007, vol. 26(3), Article 19, pp. 1-7, DOI: 10.1145/1239451.1239470.

Kalnins, R. D., et al., "WYSIWYG NPR: Drawing Strokes Directly on 3D Models," Proc. 29th Annual Conference on Computer Graphics and Interactive Techniques (SIGGRAPH 2002), ACM Trans. Graph., Jul. 2002, vol. 21(3), 10 pages, DOI: 10.1145/566570.566648.

Kingma, D., et al., "Adam: A Method for Stochastic Optimization," Proc. 3rd International Conference for Learning Representations (ICLR 2015), Jan. 30, 2017, pp. 1-15, URL: https://arxiv.org/abs/1412.6980v9.

Koch, S., et al., "ABC: A Big CAD Model Dataset for Geometric Deep Learning," Proc. Conference on Computer Vision and Pattern Recognition (CVPR), Apr. 30, 2019, pp. 1-15, URL: https://arxiv.org/abs/1812.06216v2.

Li, T-M., et al., "Differentiable Vector Graphics Rasterization for Editing and Learning," ACM Trans. Graph., Dec. 2020, vol. 39(6), Article 193, pp. 1-15, DOI: 10.1145/3414685.3417871.

Li, Y., et al., "Im2Pencil: Controllable Pencil Illustration from Photographs," Proc. Conference on Computer Vision and Pattern Recognition (CVPR), 2019, 10 pages, URL: https://arxiv.org/abs/1903.08682v1.

Li, Y., et al., "Universal Style Transfer via Feature Transforms," Proc. 31st Conference on Neural Information Processing Systems (NIPS '17), 2017, pp. 1-11.

Liu, D., et al., "Neural Contours: Learning to Draw Lines from 3D Shapes," Proc. Conference on Computer Vision and Pattern Recognition (CVPR), Apr. 5, 2020, 12 pages, URL: https://arxiv.org/abs/2003.10333v3.

Lu, J., et al., "HelpingHand: Example-based Stroke Stylization," ACM Trans. Graph., Jul. 2012, vol. 31(4), Article 46, pp. 1-10, DOI: 10.1145/2185520.2185542.

Lu, J., et al., "RealBrush: Painting with Examples of Physical Media," ACM Trans. Graph., Jul. 2013, vol. 32(4), Article 117, pp. 1-12, DOI: 10.1145/2461912.2461998.

Mao, X., et al., "Least Squares Generative Adversarial Networks," Proc. 2017 IEEE International Conference on Computer Vision (ICCV), 2017, 9 pages, DOI: 10.1109/ICCV.2017.304.

Ohtake, Y., et al., "Ridge-Valley Lines on Meshes via Implicit Surface Fitting," ACM Trans. Graph., Aug. 2004, vol. 23(3), pp. 609-612, DOI: 10.1145/1015706.1015768.

Párk, T., et al., "Contrastive Learning for Unpaired Image-to-Image Translation," Proc. ECCV, Aug. 20, 2020, pp. 1-29, URL: https://arxiv.org/abs/2007.15651v3.

Thibault, A., et al., "Making Concept Art Real for Borderlands," Proc. SIGGRAPH'10, 2010, 80 pages, URL: http://stylized.realtimerendering.com/#borderlands.

Uchida, M., et al., "Stylized line-drawing of 3D models using CNN with line property encoding," Computers & Graphics, 2020, vol. 91, pp. 252-264.

U.S. Notice of Allowance dated Oct. 4, 2023 in U.S. Appl. No. 17/452,568.

Winkenbach, G., et al., "Computer-Generated Pen-and-Ink Illustration," Proc. 21st Annual Conference on Computer Graphics and Interactive Techniques (SIGGRAPH '94), 1994, 11 pages, DOI: 10.1145/192161.192184.

(56) References Cited

OTHER PUBLICATIONS

Winkenbach, G., et al., "Rendering Parametric Surfaces in Pen and Ink," Proc. $23^{rd}$ Annual Conference on Computer Graphics and Interactive Techniques (SIGGRAPH '96), 1996, 9 pages, DOI: 10.1145/237170.237287.

Zhang, R., et al., "The Unreasonable Effectiveness of Deep Features as a Perceptual Metric," Proc. Conference on Computer Vision and Pattern Recognition (CVPR), Apr. 10, 2018, pp. 1-14, URL: https://arxiv.org/abs/1801.03924v2.

Zhu, J-Y., et al., "Unpaired Image-to-Image Translation using Cycle-Consistent Adversarial Networks," Proc. 2017 IEEE International Conference on Computer Vision (ICCV 2017), Aug. 24, 2020, 18 pages, URL: https://arxiv.org/abs/1703.10593v7.

* cited by examiner

GENERATION OF STYLIZED DRAWING OF THREE- DIMENSIONAL SHAPES USING NEURAL NETWORKS

PRIORITY

This application is a division of and claims the benefit of priority to U.S. patent application Ser. No. 17/452,568 filed Oct. 27, 2021 and entitled "GENERATION OF STYLIZED DRAWING OF THREE-DIMENSIONAL SHAPES USING NEURAL NETWORKS," which claims the benefit of priority to Greek Patent Application No. 20210100690 filed Oct. 11, 2021 and entitled "GENERATION OF STYLIZED DRAWING OF THREE-DIMENSIONAL SHAPES USING NEURAL NETWORKS," the contents of which are incorporated herein by reference in their entireties.

BACKGROUND

Field of Disclosure

The present disclosure relates generally to the fields of computer-generated graphics and machine learning, and more particularly, to generation of stylized line drawings.

SUMMARY

In one aspect of the present disclosure, a system is disclosed. In one embodiment, the systems include one or more processors; and a memory component storing instructions, which when executed by the one or more processors, cause the one or more processors to perform operations including: generating a set of vector curve paths from a viewpoint of a three-dimensional (3D) shape; extracting, using a first neural network of a plurality of neural networks of a machine learning model, surface geometry features of the 3D shape based on geometric properties of surface points of the 3D shape; determining, using a second neural network of the plurality of neural networks of the machine learning model, a set of at least one predicted stroke attribute based at least on the surface geometry features and a predetermined drawing style; generating, based on the at least one predicted stroke attribute, a set of vector stroke paths corresponding to the set of vector curve paths; and outputting a two-dimensional (2D) stylized stroke drawing of the 3D shape based at least on the set of vector stroke paths.

In another aspect of the present disclosure, a non-transitory computer-readable medium storing instructions is disclosed. In one embodiment, the instructions when executed by the one or more processors, cause the one or more processors to perform operations including: generating a set of vector curve paths from a viewpoint of a three-dimensional (3D) shape; extracting, using a first neural network of a plurality of neural networks of a machine learning model, surface geometry features of the 3D shape based on geometric properties of surface points of the 3D shape; determining, using a second neural network of the plurality of neural networks of the machine learning model, a set of at least one predicted stroke attribute based at least on the surface geometry features and a predetermined drawing style; generating, based on the at least one predicted stroke attribute, a set of vector stroke paths corresponding to the set of vector curve paths; and outputting a two-dimensional (2D) stylized stroke drawing of the 3D shape based at least on the set of vector stroke paths.

In another aspect of the present disclosure, a computer-implemented method is disclosed. In one embodiment, the computer-implemented method includes: receiving a training drawing and a representation of a corresponding training three-dimensional (3D) shape into a machine learning model; and training the machine learning model based on the training drawing and the corresponding training 3D shape to generate a trained machine learning model that generates a two-dimensional (2D) stylized stroke drawing of an input 3D shape based at least on a style of the training drawing and surface geometry features of the input 3D shape.

BRIEF DESCRIPTION OF THE DRAWINGS

Like reference numbers and designations in the various drawings indicate like elements.

DETAILED DESCRIPTION OF EMBODIMENTS

Stylized drawings are a visually appealing medium for representing objects, concepts, people, etc. Artists and amateurs alike draw pictures of three-dimensional (3D) objects in many different styles, whether for art, animation, architectural design, 3D authoring, or simply the pleasure of drawing. While there are broad styles that artists use, each artist tends to use one or more personally distinct drawing styles that vary from one artist to another. For instance, artists may have a natural tendency to deform curves and vary pressure and/or thickness along strokes in a particular manner.

Conventional techniques for automated image stylization are able to generate stylized line drawings from images. However, such techniques typically treat the input image as a pixel map and generate a pixel output. Such techniques do not take into account the 3D geometry of the object being depicted in the input image. As such, the generated line drawings tend to lose details and do not capture the image outlines accurately to reflect a particular artist's style. Furthermore, the output of such techniques are typically a pixel image, which limits the downstream analysis and editing of such outputs in interactive applications.

To the above ends, techniques for generating a stylized drawing of 3D shapes using neural networks are provided herein. More specifically, a machine learning model is trained using a 2D drawing (of a 3D object) created by the artist to generate vectorized curves that mimic the artist's style. Once the model has been trained according to a particular artist's style, the model is able to predict stylistic attributes that can be applied to any 3D shape to generate a stylized drawing of the 3D shape according to the artist's particular style. Examples of stylistic attributes include the artist's tendency for stroke thicknesses and displacements when drawing an object. Thickness captures, for example, natural tendencies to draw thick or thin strokes around curves. Displacement captures, for example, natural tendencies to draw lines that do not necessarily match proportions of the 3D object.

Unlike conventional techniques that convert a 2D input image to a stylized pixel image, the machine learning model disclosed herein extracts the geometry of a 3D object and applies an artist's style to the 3D geometry of the object to generate a stylized output. By considering the 3D geometry of the object being depicted, the artist's stroke tendency is applied to finer details to result in a more accurate stylized drawing. Furthermore, the stylized output is generated as a vector graphic output instead of a pixel image. The vector graphic output is scalable without losing resolution, and is editable in post-processing graphic design tools. Moreover, training requires only one drawing from an artist, and thus eliminating the need to obtain multiple drawings from the artist.

Overview of Generation of Stylized Drawing

Figure 1:
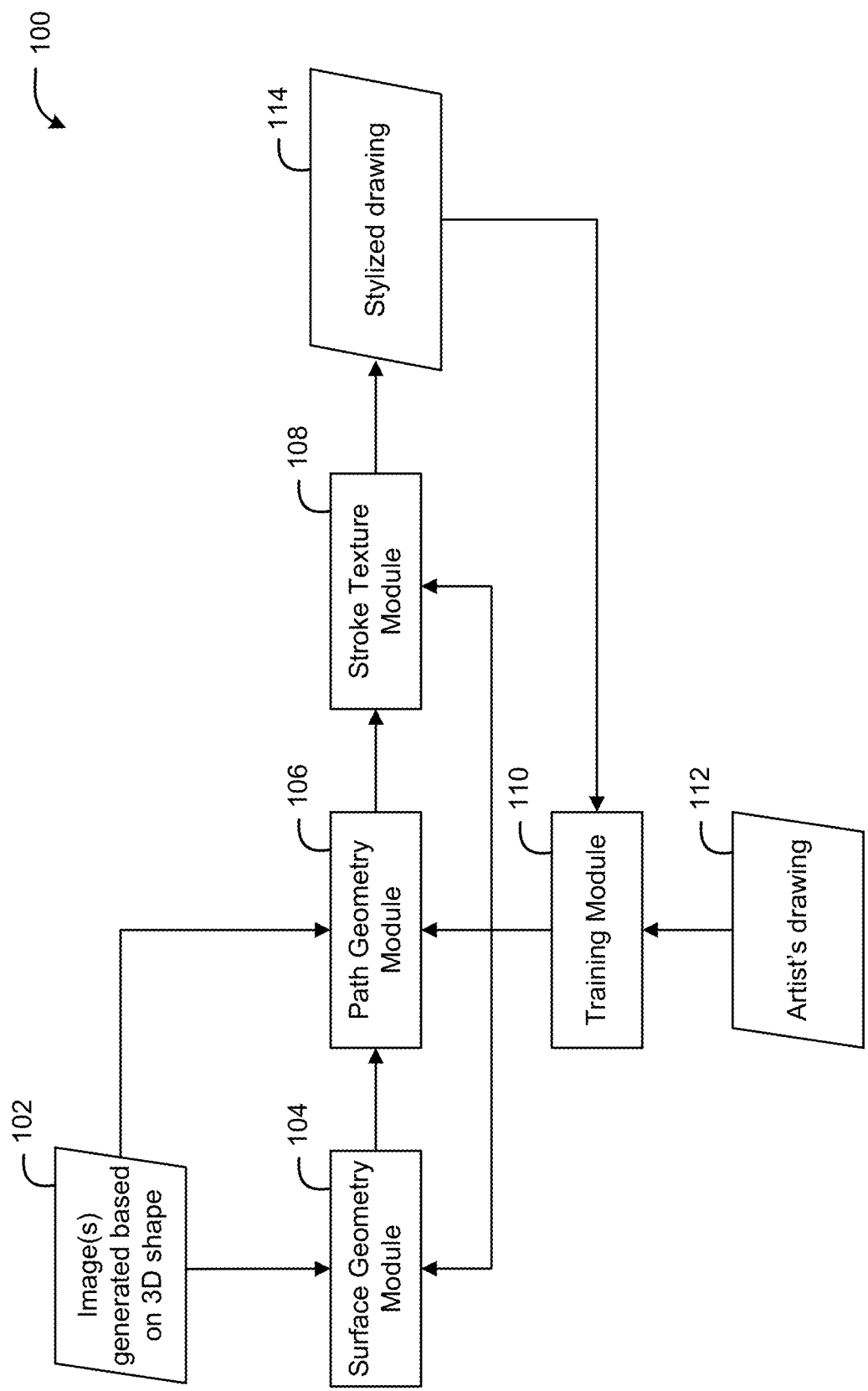
FIG. 1 shows one embodiment of a system configured to use a learning model to generate a stylized two-dimensional (2D) rendering based on a three-dimensional (3D) shape.

FIG. 1 shows one embodiment of a system 100 configured to use a learning model to generate a stylized two-dimensional (2D) rendering based on a three-dimensional (3D) shape. The system 100 includes a machine learning model that takes as input a 3D shape and a camera position and produces a stylized vector rendering represented as a set of strokes, that is, curves with varying thickness and texture. This allows emulation of the appearance of drawing medium (e.g., pen, pencil, paint, etc.) in the way artists vary pressure and/or thickness along strokes.

A machine learning model may refer to a computational algorithm that indicates relationships between input variables and output variables. In some embodiments, a machine learning model may be trained. Training a machine learning model may involve, among other things, determining values of weights associated with the machine learning model, where relationships between the input variables and the output variables are based at least in part on the determined weight values. In one example, a machine learning model may be trained in a supervised manner using a training set that includes labeled training data. In a more particular example, the labeled training data may include inputs and manually annotated outputs that the machine learning model is to approximate using determined weight values. In other embodiments, a machine learning model may be trained in an unsupervised manner in which weight values are determined without manually labeled training data.

Texture in this context refers to visual qualities of a drawing. Depending on who is drawing or how a drawing has been generated (e.g., using the techniques described herein), there will be variations in visual qualities such as stroke thickness, deformation, color, grit, roughness, fuzziness, transparency, brightness, consistency, etc. associated with the drawing. In some instances, corresponding portions of multiple drawing have a fairly consistent visual quality indicative of a particular artist's style. By way of an example, two drawings having consistently thicker strokes in low-curvature regions are indicative of an artist's style. Additional examples and comparisons are presented in FIGS. 2A-2C, 5A and 5B.

As shown, the system 100 receives as an input one or more images 102 that have been generated based on a 3D shape. The 3D shape is an object in physical space. In some embodiments, the images 102 include one or more geometric curves (C), which in some embodiments are generated based on the 3D shape by a curve extraction module (not shown). In some embodiments, the geometric curves (C) are represented as raw curve features comprising the tangent and normal directions associated with control points along the curve. The various forms of the images 102 will be described in detail with respect to FIG. 3A.

The images 102 further include one or more surface geometry renderings, which include image data and/or 2D renderings obtained based on the 3D shape and a camera position viewing the 3D shape (e.g., viewpoint). For example, the surface geometry renderings include image-space renderings of the 3D shape captured from a particular position of the camera. The camera refers to any image-capturing apparatus, including sensors (e.g., radar to measure depths). The position of the camera is described with respect to various measurements, such as height, azimuth angle, elevation angle, and distance with respect to at least one reference point; aperture (f-number) of the camera; etc.

An image-space rendering includes pixels each containing geometric properties of the surface point that projects to that pixel. In some embodiments, there are at least seven input channels per pixel: (1) object depth from camera, (2) radial curvature, (3) maximum and (4) minimum principal surface curvatures, (5) view-dependent surface curvature, (6) dot product of surface normal with view vector, and (7) a binary image containing the line segments of vector paths of the geometric curves. At least some of these geometric properties are used to predict accurate stroke geometry.

In some embodiments, the system 100 includes a surface geometry module 104. In some implementations, surface geometry module 104 is implemented using a 2D full convolution neural network (CNN). Data representative of or derived from at least a portion of the surface geometry renderings in the images 102 are inputted into the surface geometry module 104 to generate a set of feature maps (F), as will be discussed in more detail with respect to FIG. 3A.

In some embodiments, the system 100 includes a path geometry module 106. In some implementations, path geometry module 106 is implemented using a CNN that performs one-dimensional (1D) convolutions. Path geometry module 106 uses a 1D CNN. The path geometry module 106 operates on a set of control points as opposed to a pixel map. The input to the 1D CNN includes the raw curve features associated with each control point in the set of control points of geometric curves (C) and the set of feature maps (F) generated by the surface geometry module 104 from the surface geometry renderings. The output is a set of vector paths representing untextured strokes.

The path geometry module 106 uses the 1D CNN to predict stroke attributes. In some embodiments, the stroke attributes include thickness and/or 2D displacement of each control point along each vector path. Each artist has a different drawing style, which is reflected by, e.g., the stroke attributes. More specifically, each point along a vector path has one or more of the stroke attributes (e.g., thickness and/or displacement) applied to it to simulate the appearance of an artist-drawn stroke, as will be discussed in further detail below.

In some embodiments, the system 100 also includes a stroke texture module 108. In some implementations, stroke texture module 108 is implemented using a 2D CNN. In some embodiments, the stroke texture module 108 is configured to predict texture for the strokes. Texture varies according to depth and underlying shape features; e.g., an artist uses darker strokes for strong shape protrusions, and lighter strokes for lower-curvature regions. The stroke texture module 108 is configured to predict a textured, stylized drawing 114 from a rasterization of the vector paths generated by the path geometry module 106. In some embodiments, the stylized drawing 114 outputted by the stroke texture module 108 is in the form of a raster drawing.

In some embodiments, the system 100 includes a training module 110 configured to train the aforementioned machine learning model, which includes the CNN of the surface geometry module 104, the 1D CNN of the path geometry module 106, and the CNN of the stroke texture module 108. The goal of the training procedure is to learn the weight parameters $w=\{w_1, w_2, w_3\}$ of the respective surface geometry module 104, path geometry module 106, and stroke texture module 108.

To train the machine learning model, at least a drawing made by an artist based on rendered line drawings is used as the training drawing. Given the potential difficulties in obtaining multiple drawings drawn in a fully consistent manner from an artist, the training module is able to use only a single artist-drawn training example alone such as artist's drawing 112 to train the machine learning model. To generate multiple training instances from a single drawing, portions of the artist's drawing 112 are used, such as randomly selected cropped patches from the artist's drawing 112 capturing strokes at different locations and scales. In some embodiments, only sample patches that contain strokes are used during training. For each patch, a crop size c is randomly chosen from a set of scales, for example {64×64, 128×128, 192×192, 256×256}. The images (e.g., images 102) and feature maps used by the machine learning model are also cropped accordingly. Each of the sample patches is treated as a separate training instance. In some embodiments, multiple training examples from a given artist, and different cropping resolutions (including non-square), are used.

In some embodiments, the training module 110 is configured to pre-train the surface geometry module 104, path geometry module 106, and stroke texture model 108. Various loss terms/functions are used for optimizing these modules 104, 106, 108 (e.g., to determine $w_1$, $w_2$, and $w_3$ for the particular artist's style). In one implementation, the surface geometry module 104 and path geometry module 106 are pre-trained with a first loss function that combines two loss terms with regularization, and the stroke texture model 108 are pre-trained with a second loss function that combines two other loss terms with regularization. All three modules are then trained end-to-end collectively using the weighted sum of all four loss terms. Regularization rate (k), learning rate, and batch size of different values are set according to different implementations and training scenarios. In some implementations, each module is alternatively trained with their individual loss functions. Loss functions and regularization terms will be discussed in more detail further below.

In some embodiments, at least a portion (e.g., cropped portions) of the stylized drawing 114 is evaluated by the training module 110. One or more cropped portions of the stylized drawing 114 are used in at least one of the loss functions. In some embodiments, errors or deviations between the artist's training drawing 112 and the stylized drawing 114 (e.g., due to errors in the predicted stroke attributes such as thickness, displacement, etc.) are determined, and the model performs a backpropagation process given the errors to adjust the weight parameters $w_1$, $w_2$, and $w_3$ of the model.

Figure 2A:
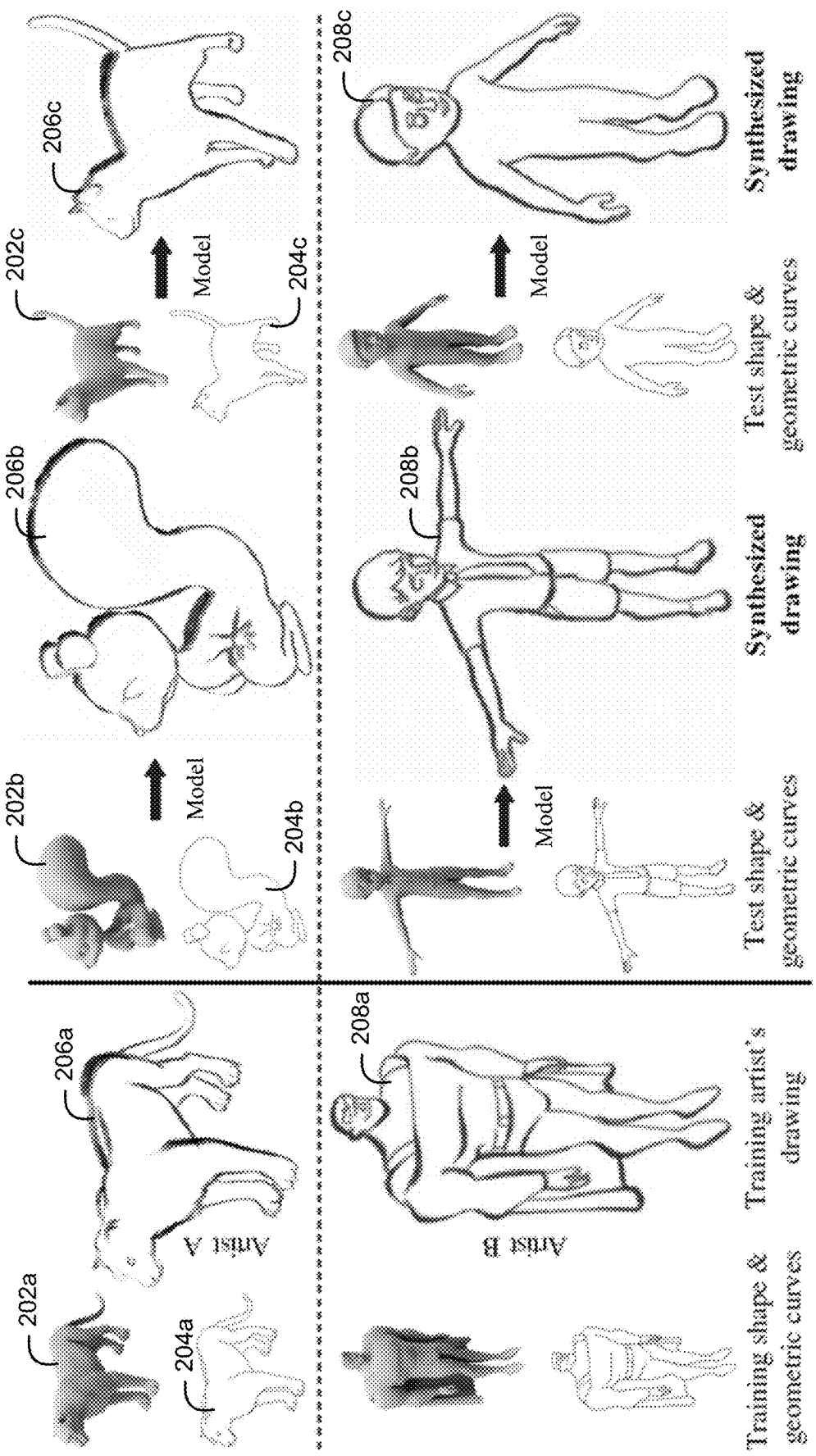
FIGS. 2A-2C show examples of stylized line drawings generated based on a single example of a training shape and corresponding drawing.

Referring now to FIG. 2A, examples of stylized line drawings generated based on a single example of a training shape and corresponding drawing are illustrated. Given a test 3D shape 202a and 2D geometric curves 204a representing the test 3D shape, a learning model (e.g., of the system 100 of FIG. 1) synthesizes a line drawing 206a in the style of the training example. FIG. 2A shows several synthesized drawings by transferring the artist's style A (top) or B (below). Each of the generated drawings 206b, 206c generated from respective 3D shapes 202a, 202b and respective geometric curves 204b, 204c resembles the drawing 206a produced during training with style A. Similar outcomes are seen with style B, where generated drawings 208b, 208c resembles the training drawing 208a.

Figure 2B:
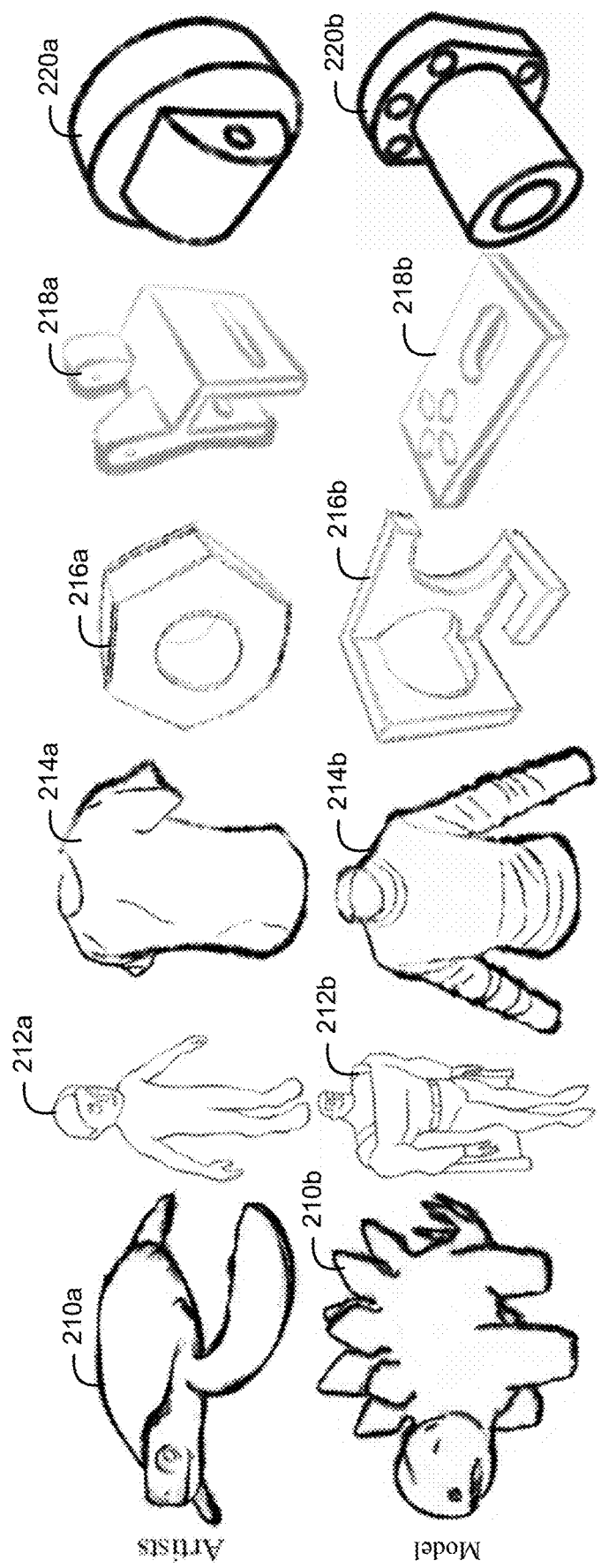

FIG. 2B further illustrates additional examples of stylized line drawings generated by the model disclosed herein. Each of the drawings 210b, 212b, 214b, 216b, 218b and 220b generated via the model resembles the respective style of the respective training drawings 210a, 212a, 214a, 216a, 218a and 220a. Taking drawings 210a and 210b as an example, thicker strokes are retained in low-curvature regions. Strokes are thicker on right-facing parts of the surface. The charcoal-like stroke texture has been transferred. In the second example of drawings 212a and 212b, the thin strokes have been accurately transferred, with stroke thickness often thicker around convex bulges.

Figure 2C:
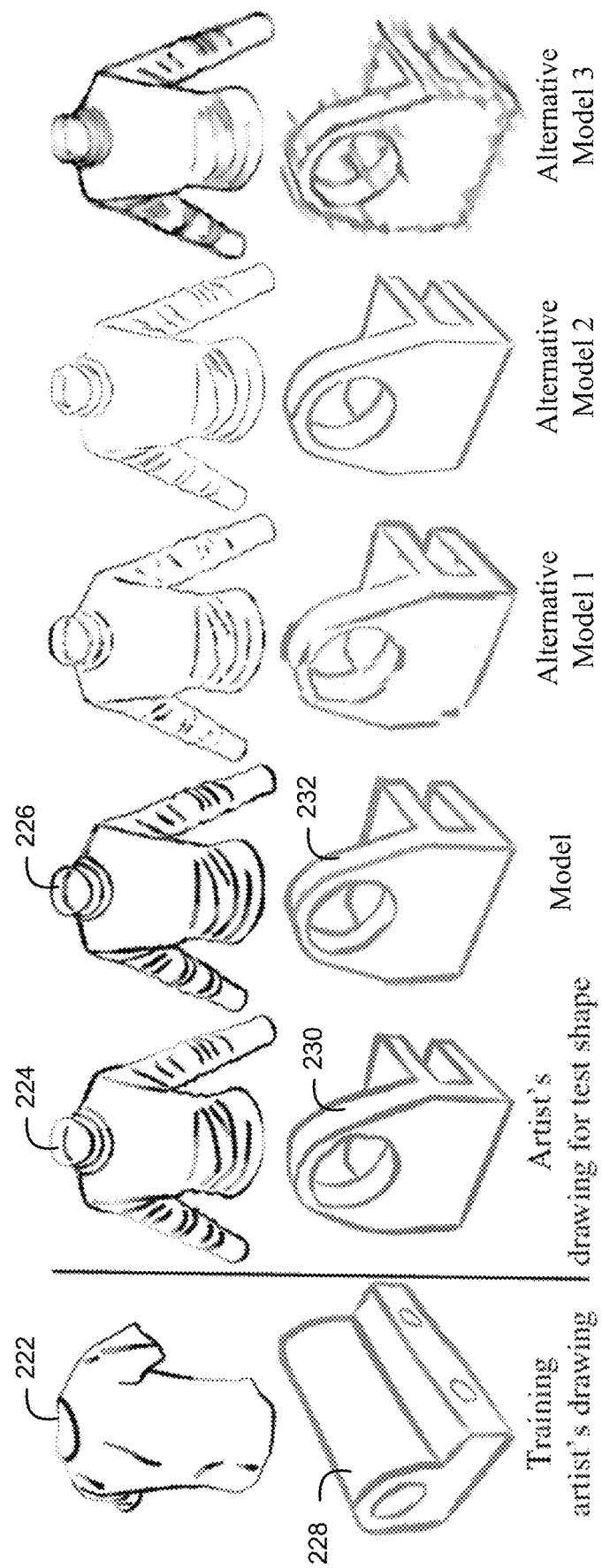

FIG. 2C illustrates two more examples comparing the training artist's drawing, the artist's drawing for a new test shape, and a drawing for the new test shape generated by the model disclosed herein. As shown, the training artist's drawing 222 has a given style. The artist produces a drawing 224 for another test object having the given style. The model is able to generate a drawing 226 having a very similar style to the given artist's style, when compared to alternative models. Similarly, the style of another artist's drawings 228 and 230 are shown to be translated to the drawing 232 generated by the model described herein. More specifically, the model produces strokes having more similar texture, intensity, and thickness variation to the artist's drawing as compared to other alternative models.

As can be seen, the alternative models generally produce less accurate results. Such alternative models generally use an image-to-image model that translates a plain image into a textured image, but they (i) generally take a pixel image as input and generate a pixel image as output, (ii) do not take 3D shape and stroke geometry into consideration, and (iii) output a raster image (which are resolution dependent and cannot scale up like vector images). It is also observed that the alternative models do not accurately transfer stroke thicknesses from the example drawings 222, 228. As a result, such techniques often produce noisy results (e.g., gaps in strokes, blurry strokes) and lose image details from the input geometry. The disclosed model advantageously accounts for the shape of the 3D shape and geometric curves, and generates useful vector outputs based on stroke attributes applied to curve features, as will be discussed in greater detail below. The disclosed approach thus results in more precise stylized strokes, with fewer artifacts, agreeing with the artists' corresponding styles in terms of, e.g., stroke thickness, shape, and texture.

Architecture

Figure 3A:
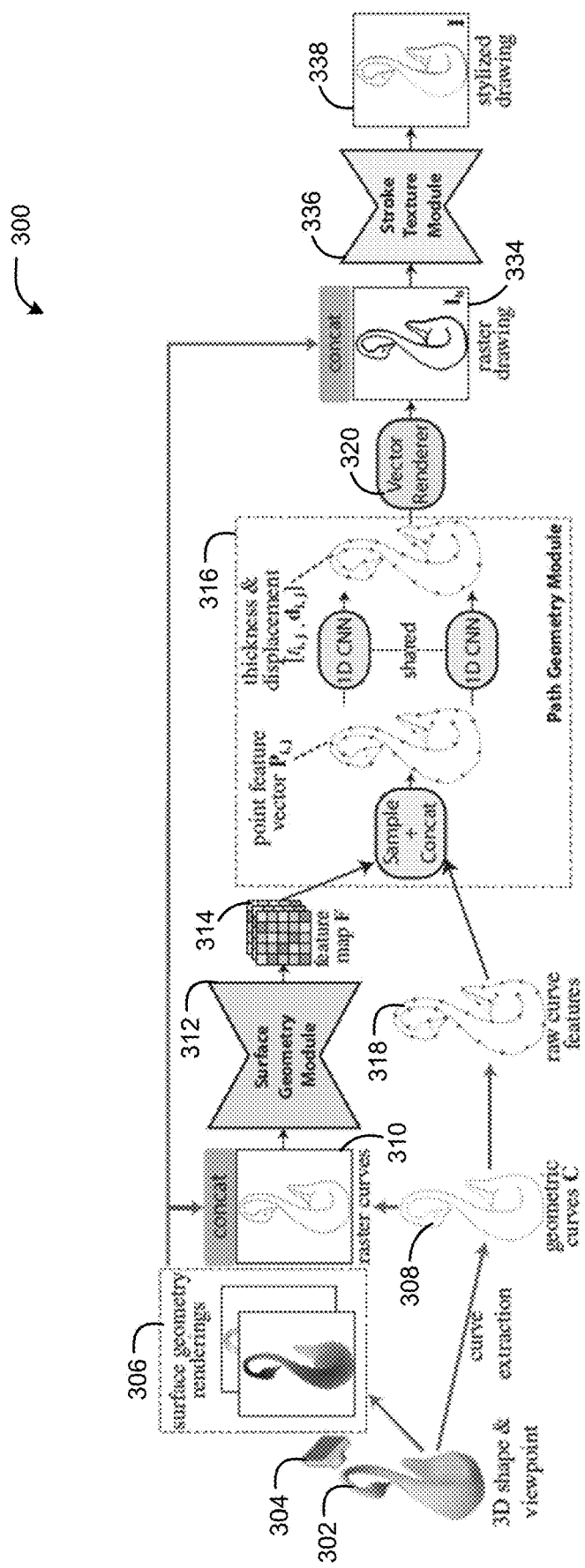
FIG. 3A illustrates one embodiment of an architecture of a system for use with a model configured to predict stroke attributes from a 3D shape and generate a stylized line drawing in accordance with the predicted stroke attributes.

FIG. 3A is a block diagram illustrating one embodiment of an architecture of a system 300 for use with a model configured to predict stroke attributes (e.g., thickness and/or displacement) from a 3D shape and generate a stylized line drawing in accordance with the predicted stroke attributes.

In one embodiment, the model performs various functionalities, including, but not limited to, (i) obtaining a viewpoint of a 3D object; (ii) extracting salient imaging data from the viewpoint such as surface geometry, geometric curves, and/or raw curve features; (iii) obtaining one or more feature maps correlating to the imaging data; (iv) predicting stroke attributes (e.g., thickness, displacement); (v) output a set of vectors with predicted stroke attributes applied to imaging data; (vi) generate an untextured (e.g., rasterized) drawing; and (vii) generate a textured or stylized drawing.

Moreover, as alluded to with respect to FIG. 1, several modules (i.e., surface geometry module 104, path geometry module 106, stroke texture module 108) are operative in this model, each of the modules having been trained by a machine learning process by a training module (e.g., 110) that takes as an input an artist-drawn image having a particular style (e.g., tendency to have different thicknesses or arc lengths for different curvature types) as discussed with respect to FIGS. 2A-2C. The training module updates the parameters (e.g., weights) for each of the modules based on optimization process involving minimizing loss terms/functions. The trained model is then able to generate a stylized line drawing from a 3D shape in the particular style of the artist whose drawing was used to train the model.

Referring back to FIG. 3A, in some embodiments, the system 300 receives a viewpoint of a 3D shape 302. The viewpoint is obtained via an image-capturing apparatus 304, which includes a camera and/or other types of sensors (e.g., radar to measure depths of surface features of the 3D shape). The 3D shape 302 is an example of the 3D shape or object discussed with respect to FIG. 1. The image-capturing apparatus 304 is an example of the camera or the image-capturing apparatus discussed with respect to FIG. 1.

In some embodiments, the system 300 generates (e.g., via a corresponding surface geometry rendering module not shown) surface geometry renderings 306. The surface geometry renderings 306 are examples of the surface geometry renderings discussed with respect to FIG. 1, which includes the seven geometric properties of pixels corresponding to the 3D shape 302.

In some embodiments, the system 300 generates (e.g., via a corresponding curve extraction module not shown) a set of geometric curves (C) 308. Geometric curves are plain curves in their "base" form of the 3D shape (e.g., outlines of at least some features of the 3D shape), which are converted into stylized strokes by assigning, e.g., thickness, displacement, and/or texture along these curves. The geometric curves are extracted using an existing algorithm for creating vector line drawings from 3D shapes (e.g., using pretrained geometry branch of Neural Contours, which combines curves from several existing algorithms including Occluding Contours, Suggestive Contours, Apparent Ridges, Ridges and Valleys to perform line drawing based on geometric features of a 3D model).

In some embodiments, the geometric curves 308 are represented as polylines including N vector paths $C=\{c_i\}_{i=1}^{N}$, where, for point j on path i, $c_i$ is a sequence of densely sampled control points $c_i = \{c_{i,j}\}_{j=i}^{M_i}$ each having a 2D position with uniform spacing, $M_i$ is the number of points on the path, and $c_{i,j}$ represents the 2D position of point j on path i.

In some embodiments, the model of the system 300 is configured to produce one stylized output stroke for each of the geometric curves 308. The goal of the model is to convert the unstylized geometric curves 308 to strokes with new shape by applying predicted stroke attributes (e.g., thickness and/or displacement). In some embodiments, stroke control points are represented as displacements from the input geometric curves 308. A "control point" refers to one of a set of points used to determine the shape of a curve (or a higher-dimensional object such as a surface). Displacement, and applying displacement values to the geometric curves 308, emulate the ways that artists deform curves (e.g., smoothing curves, adding "wiggles" or short irregular curves, etc.).

Each input polyline $c_i$ of the geometric curves 308 is associated with a 1D thickness $t_{i,j}$ for each control point $c_{i,j}$ together with a displacement vector $d_{i,j}$. That is, $t_{i,j}$ and $d_{i,j}$ are applied to each control point. Hence, the stroke control points of the output stroke (particularly, any new location of the control point after applying the displacement) is represented as $\{c_{i,j}+d_{i,j}\}$, which will be discussed in greater detail with respect to FIG. 3B, which illustrates the application of predicted stroke attributes on the stroke control points of a geometric curve.

Various factors affect an artist's tendency for stroke thickness and displacement. For example, image-space geometric shape and surface shading features affect the stroke thickness and displacement. Stroke thickness and displacement also depend on the shape of the stroke itself, including phenomena like tapering, stroke smoothing, and "wiggliness." Wiggliness is captured as deformations of the polyline, for example, by pushing points in $c_i$ in opposite directions. To predict stroke geometry including stroke attributes such as thickness and displacement, the model incorporates information from both the 3D shape's surface geometry and information along the polyline (e.g., points in $c_i$).

Referring back to FIG. 3A, in some embodiments, the system 300 includes a surface geometry module 312. The surface geometry module 312 is an example of the surface geometry module 104 of FIG. 1 and vice versa.

In some embodiments, the surface geometry module 312 processes the surface geometry of the 3D shape via a 2D CNN, and output a set of image-space feature maps F. More specifically, image data for the aforementioned surface geometry renderings (including at least some of the seven geometric properties) and geometric curves are inputted to the surface geometry module 312. In some embodiments, the surface geometry module 312 is configured to generate a concatenated set of feature maps (V) based on the input image data, e.g., geometric and shading features (e.g., object depth from camera, radial curvature, maximum and minimum principal surface curvatures, view-dependent surface curvature, dot product of surface normal with view vector, and a binary image containing the line segments of vector paths of the geometric curves. In some embodiments, the input also includes image data for raster curves 310, the image data being generated based on a concatenation of the surface geometry renderings 306 and the geometric curves 308.

In one scenario, the surface geometry module 312 generates a set of 768×768×7 feature maps (V) from the surface geometry renderings as the input to the neural network function. That is, this map would have seven geometric properties for each pixel of 589,824 pixels (768×768). In some embodiments, the concatenated feature maps pass through a neural network function (e.g., the 2D CNN) to generate and output a set of 768×768×40 deep feature maps 314 represented as F=f(V; $w_1$), where f is implemented with a ResNet-based fully convolutional network with four residual blocks, and $w_1$ are weight parameters learned during training (discussed elsewhere below). In some embodiments, each of the generated maps are stored as, e.g., a set of matrices, XML file, or any suitable organized data structure.

In some embodiments, the system 300 includes a path geometry module 316. In some embodiments, the path geometry module 316 includes a neural network (e.g., 1D CNN) applied to each of the geometric curves 308 using 1D convolutions. In some implementations, multiple 1D CNNs are implemented by the path geometry module 316. Each point {i, j} on a curve has a set of curve features and features from the shape geometry each associated with the point. The set of curve features associated with a point include a 2D curve normal, a 2D tangent direction, and a normalized arc length (e.g., length along the curve) from the nearest endpoint. The normalized arc length allows the model to learn to taper stroke thickness, whereas the curve normal and the tangent direction capture image-space curve orientations. Since the orientation of the curve is ambiguous, a positive/negative sign ambiguity exists in the tangent direction $e_{i,j}$ and normal $n_{i,j}$ per curve point. To handle the ambiguity, two alternative curve features sets are assigned: one using ($e_{i,j}$, $n_{i,j}$) and another set using ($-e_{i,j}$, $-n_{i,j}$). This results in two sets of raw curve features for each point, each set having five dimensions: (1) {$e_{i,j}$, $n_{i,j}$, arc length}; and (2) {$-e_{i,j}$, $-n_{i,j}$, arc length}. Note that each of $e_{i,j}$ and $n_{i,j}$ is a 2D vector for the point {i, j}, resulting in a total of five raw curve features per set.

In some embodiments, input to the path geometry module 316 include (i) raw curve features 318, which are based on the geometric curves 308 and include stroke control points defined by spacing along the geometric curves 308, and in addition, (ii) the deep surface geometry features from the set of deep feature maps 314 (F) generated by the surface geometry module, and (iii) weight parameters (e.g., $w_2$ obtained from previous training).

Specifically, in one embodiment, for each point on a curve, bilinear interpolation is applied to the set of deep feature maps 314, which is then concatenated with each of two sets of raw curve features 318 for the vector paths to result in additional feature maps. For example, given the two sets of five raw curve features, concatenation of the 40 deep surface geometry features and five raw curve features may result in two sets of $M_i \times 45$ feature maps ($P_i$, $P'_i$) for the path i. where $M_i$ is the number of control points in the path. In this manner, the path geometry module 316 jointly processes view-based features of the surface geometry together with geometric properties specific to a given vector path.

In some embodiments, the above raw curve features and deep surface geometry features are inputted into a neural network function (e.g., 1D CNNs) of the path geometry module 316 to predict 1D thickness scalars and 2D displacement vectors for each control point along each vector path as:

$$[t_i, d_i] = \text{avg}(h(P_i; w_2), h(P'_i; w_2))$$ Eqn. 1 where $d_i = \{d_{i,j}\}_{j=1}^{M_i}$ are the predicted per-point displacements, $t_i = \{t_{i,j}\}_{j=1}^{M_i}$ are per-point thicknesses, and $w_2$ are weight parameters learned from the reference drawing training input. Training will be discussed in additional detail below.

In the above equation, the "avg" function performs average pooling over predictions of the two alternative feature sets ($P_i$, $P'_i$) to ensure invariance to the sign of curve orientation. The function h is implemented as a 1D CNN.

In one example implementation, the 1D CNN may be made of three (3) layers, each using filters of kernel size 3, stride 1, and zero padding. The first two layers are followed by Rectified Linear Unit (ReLU) activation functions. The last layer has three (3) output channels: two for the 2D displacement, and one for thickness. An activation function transforms a summed weighted input from a node into the activation of the node or output for that input. ReLU is a piecewise linear function that outputs the input directly if it is positive, and otherwise, output zero. Hence, for thickness, a ReLU activation is used to guarantee non-negative outputs, while nonlinearity is not used for the 2D real-valued displacement output.

Figure 3B:
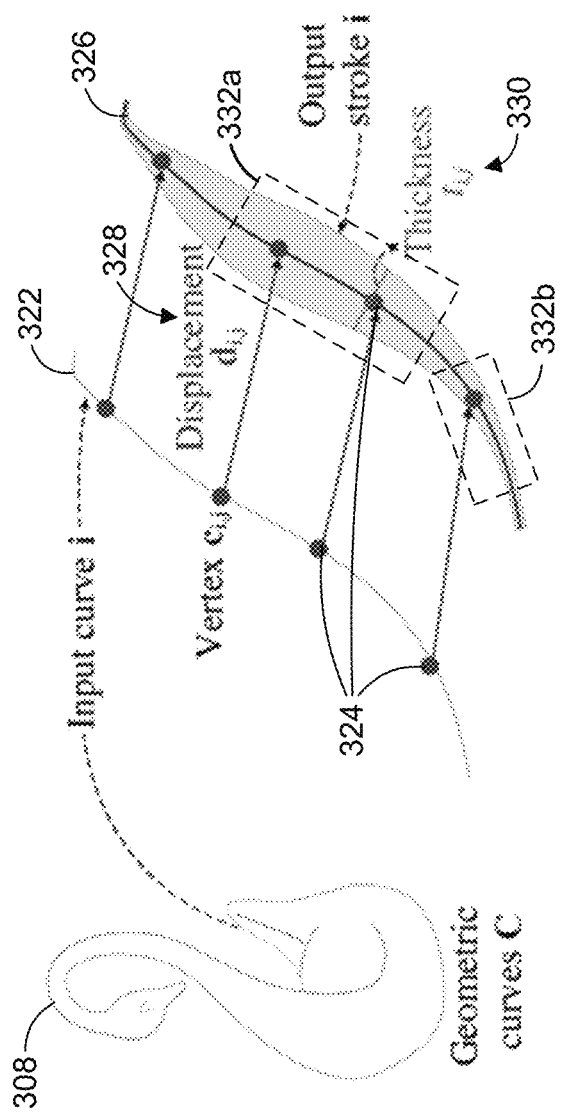
FIG. 3B illustrates an application of predicted stroke attributes on the stroke control points of a geometric curve.

In some embodiments, the system 300 includes a differentiable vector renderer 320. The differentiable vector renderer 320 is configured to generate a raster drawing from new vector paths based on the predicted thickness and/or displacement (e.g., from Eqn. 1). Referring briefly to FIG. 3B, a diagram shows one input curve 322 from the geometric curves 308, and stroke control points 324 of the input curve 322. Each stroke control point 324 is represented by a corresponding point $c_{i,j}$. Given the predicted displacement $d_i$ 328 for each vector path $c_i$, new vector paths are formed as an output stroke 326 and represented as $c'_i = c_i + d_i$. In some embodiments, these new vector paths are also modified based on 1D predicted thickness $t_i$ 330. More specifically, an extension associated with a control point 324 expands to a length dictated by the thickness $t_i$ 330. As shown in FIG. 3B, the output stroke 326 appears relatively thicker in some areas 332a and relatively thinner in some areas 332b based on thickness applied to control points 324 along the output stroke 326.

Hence, as noted above, one advantage of the techniques disclosed herein is the generation of vectorized curves (as opposed to rasterized graphics that do not scale well) via a learning model that accounts for stroke attributes such as displacement and/or thickness predicted to emulate a unique drawing style determined based on artist-drawn input image information.

In some embodiments, the new vector paths forming the output stroke 326 are rasterized into grayscale polylines. In one specific implementation, rasterization is performed using a differentiable vector graphics renderer such as DiffVG. Specifically, for each pixel in the output image, its distance to the closest point on the vector paths is computed. If this distance is smaller than half the stroke thickness of the closest point, the pixel is considered to be inside the stroke's area and assigned black color; otherwise it is marked as white. By way of example, the strokes are rendered in a 768×768 raster image $I_b$ 334 (according to the 768×768 resolution of the input set of feature maps) with anti-aliasing provided by the differentiable vector renderer. The resulting raster image 334 is in grayscale and lacks texture. In some embodiments, the raster image is a flat image in a suitable file format, e.g., a Joint Photographic Experts Group (JPEG) image, a Graphics Interchange Format (GIF) image, a Portable Network Graphics (PNG) image, a bitmap (BMP) image, a Tagged Image File Format (TIFF) image, a raw (RAW) image, or any other suitable format.

In some embodiments, the system 300 includes a stroke texture module 336 configured to predict texture for strokes in the output image $I_b$ 334 of vector renderer 320. Predicted texture varies according to various features of the 3D shape, and is represented by corresponding 2D renderings (e.g., surface geometry renderings 306). Texture varies according to features such as depth (e.g., detected by the aforementioned radar sensor) and underlying shape features. For example, an artist uses darker strokes for strong shape protrusions and lighter strokes for lower-curvature regions.

As a result, in some embodiments, the texture prediction is conditioned not only on the raster drawing $I_b$ 334 representing the generated grayscale strokes, but also the shape representations used as input to the surface geometry module 312. More specifically, texture prediction is formulated as a 2D image translation problem, which is performed at least in part by an image translation module (not shown). In some embodiments, the input to the image translation module uses the first six geometric properties (e.g., accessible via six corresponding channels) of the view-based features (V) concatenated with the raster drawing $I_b$ 334 channel-wise, resulting in a 768×768 map (U). This map is translated into a stylized drawing 338, which is an RGB image $I=g(U; w_3)$. In some implementations, g is implemented using a ResNet-based fully convolutional network with four residual blocks, and $w_3$ are parameters learned during training.

Additionally and optionally, in some embodiments, system 300 also performs post-processing. The predicted RGB colors are converted into a per-stroke texture map in order to incorporate the predicted texture into an editable vector graphics representation. More specifically, each stroke is parameterized by a 2D u-v map, whose coordinates are stored in a data structure (e.g., look-up table) to access the texture map for each stroke. The color of each pixel in a stroke's texture map is determined by the RGB color of the corresponding pixel in the translated image I.

As can be appreciated based on the above, the vector format of the various outputs described above advantageously allows magnification (i.e., zooming in) and seeing defined curves without the pixelation that occurs in rasterized images. As noted elsewhere herein, the plurality of points making up the vectorized curves are modified by stroke attributes such as thickness and displacement (predicted by NNs) to mimic an artist's particular style. Moreover, weights used in the NNs to predict the stroke attributes are trained and updated for more accurate results according to the artist's own work. In contrast, pixel-to-pixel rasterization of an input drawing does not understand or respect the existence of curves within the drawing, which often leads to noisy results that lose image details, especially for complex objects that requires fine details, such as 3D shapes. Hence, the solution for defined representations of strokes described herein more reliably captures fine details of the 3D shape while mimicking an artist's style consistently.

Training

Figure 4:
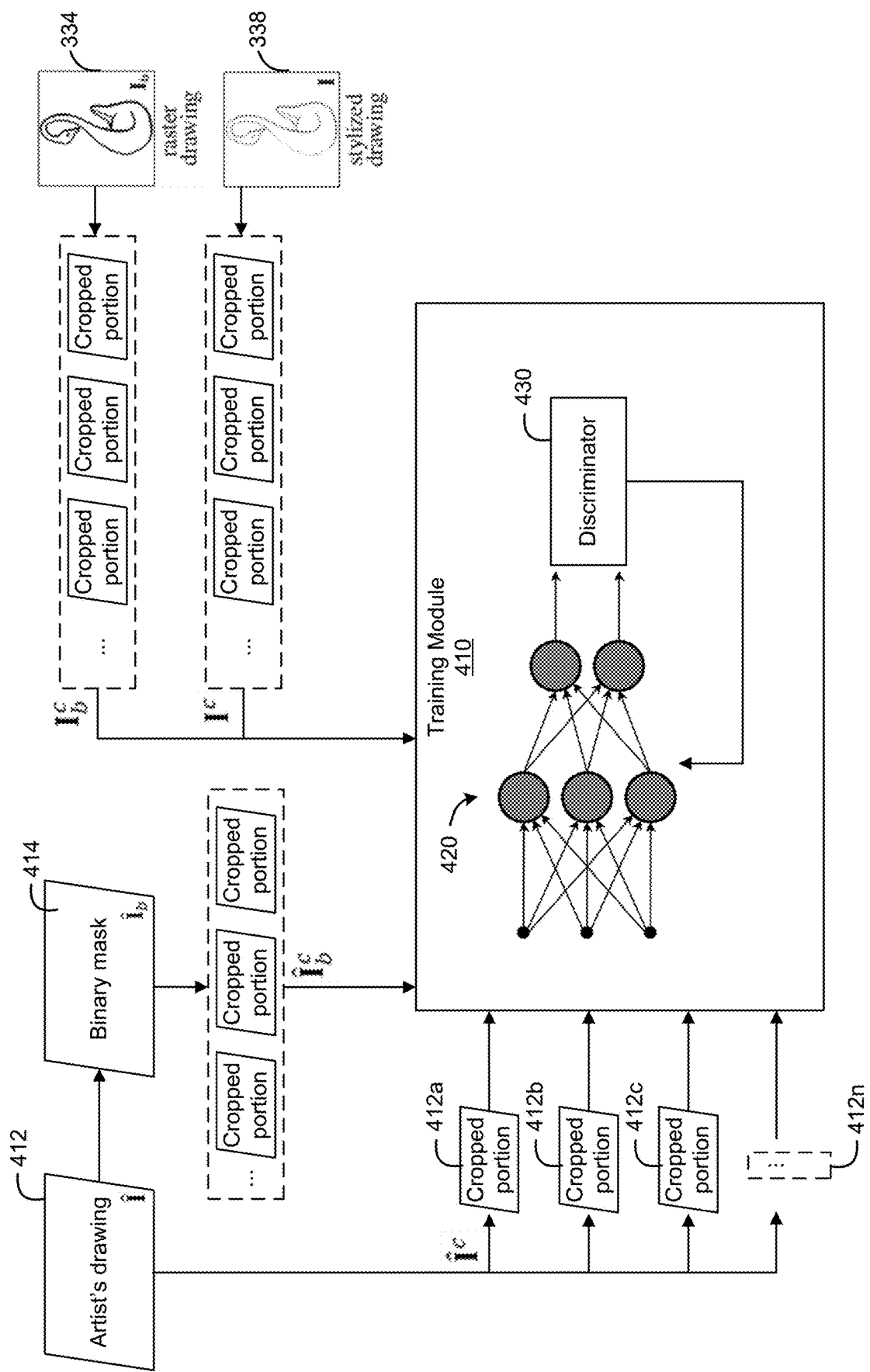
FIG. 4 is a block diagram illustrating one embodiment of a training module and its components, usable with the architecture, e.g., as illustrated in FIG. 1 or FIG. 3A.

FIG. 4 is a block diagram illustrating one embodiment of a training module 410 and its components (functional or otherwise), usable with the abovementioned architecture, e.g., as illustrated in FIG. 1 or FIG. 3A. Training module 410 is an example of the training module 110 of FIG. 1. According to various embodiments, the training module 410 is implemented in conjunction with the architecture 300 concurrently for ongoing training (e.g., end-to-end training), or separately for initial pre-training. The model described above with respect to FIG. 3A is continued to be trained after the initial pre-training. In some embodiments, training module 410 may include at least one NN 420, such as the 1D CNN described above.

To train the model described above with respect to FIG. 3A, at least one input training drawing created by artists is collected. The input training drawing is a drawing created based on a 3D shape viewed in physical space, or based on 2D representations (e.g., rendered line drawings, photographs) of the 3D shape. In some embodiments, the training module 410 is configured to receive at least portions (e.g., randomly cropped patches as will be discussed below) of the input training drawing. The goal of the training performed by the training module 410 is to learn the weight parameters $w=\{w_1, w_2, w_3\}$ to be used with the surface geometry module 312, path geometry module 316, and stroke texture module 336. The discussion that follows refer to $w_1$, $w_2$, and $w_3$ as being associated with modules 312, 316, 336 respectively. However, these notations are arbitrary and are only presented as such to aid in discussion.

In some embodiments, training includes a single training example as the input. More specifically, portions of the training example are used to provide multiple training instances. This eliminates the need to create multiple drawings in a fully consistent style and maximizes the consistency of the style of the drawing (by virtue of having one drawing), since there can still be slight variations among different drawings from the same artist. However, this does not preclude the use of multiple input drawings from the same artist in other embodiments.

In some embodiments, to obtain the input training drawing, a human artist is first provided geometric curves (C) 308, produced from a 3D shape 302 as described with respect to FIG. 3A. As noted, the geometric curves 308 are generated from a 3D shape using an existing algorithm. The artist then produces a drawing using the provided geometric curves 308 as a reference. The artist is allowed to use any suitable medium or device for the drawing. As one example, the artist provides the drawing on a digital tablet (e.g., drawing tablet or graphics tablet with stylus). The artist does not trace the feature curves so that the artist's natural tendency to deform curve shape and thickness are captured.

In some embodiments, given the input training drawing $\hat{I}$ 412, a binary mask $\hat{I}_b$ 414 is generated by assigning black for pixels containing the artist's strokes, and white for background, e.g., a black-and-white or grayscale version of the input training drawing. In some implementations, antialiasing is applied to the mask to smooth out any discontinuities.

Note that, although the drawings are paired (input 3D geometry corresponding to the input training drawing), the training need not be fully supervised. Specifically, because the drawing is provided in raster format, the stroke attributes (e.g., thickness and displacement) in the drawings—the information to be predicted—are not known. This allows flexible data collection in which different data sources can be used; e.g., artists are allowed to use different drawing tools as preferred. In other words, advantageously, various formats and the means of input for the input training drawing are usable.

In some embodiments, one or more loss functions are implemented. A loss function is an optimization function in which an error is iteratively minimized through, e.g., gradient descent. As stated above, a single input training drawing is used for training the NN. However, training a network from a single input is prone to overfitting, e.g., producing a result that fits too closely to data such that future observations cannot be predicted reliably.

To avoid this problem, in some embodiments, the training procedure includes cropping one or more random patches from the artist's input training drawing 412, and capturing strokes at different locations and scales. Each of the sampled patches is treated as a separate training instance. In some embodiments, only patches that contain strokes are used. In some embodiments, any random patches (including those that are without strokes) are used. The training module 410 chooses a crop size c for each patch, from a set of scales (e.g., 64×64, 128×128, 192×192, 256×256). The crop size is chosen at random or according to a predetermined selection. In addition, a random number of patches is selected (e.g., 25, 100, 2500). The images are then be cropped accordingly. In some embodiments, multiple training samples from a given artist, and different cropping resolutions (including non-square), can be used. The cropped images (412a, 412b, 412c, 412n) and their corresponding feature maps are then be input to the training module 410.

In some embodiments, four loss terms are used in the loss functions: $L_b$, $L_s$, $L_t$, and $L_a$ as shown below.

First, a cropped grayscale image $I_b^c$ (e.g., produced by the vector graphics renderer based on the aforementioned raster drawing $I_b$ 334) is evaluated as compared to a corresponding cropped reference binary mask $\hat{I}_b^c$, using an $L_1$ loss function ($L_1$ is also known as a Least Absolute Deviations function). In some implementations, an $L_2$ loss function (Least Square Errors function) can be used. Using the $L_1$ implementation, the loss function is expressed as follows:

$$L_b = \|I_b^c - \hat{I}_b^c\|_1 \qquad \text{Eqn. 2}$$

When using this loss function alone, it is possible for the model to generate implausible self-intersecting and noisy strokes. To handle this problem, a shape regularization term is added on the predicted displacements. Regularization terms reduce errors by fitting a function appropriately to the given training set. In some implementations, the regularization term is expressed as follows:

$$L_s = \frac{1}{N^c} \sum_{i=1}^{N^c} \frac{1}{(M_i^c - 1)} \sum_{j=1}^{M_i^c - 1} \|d_{i,j} - d_{i,j+1}\|^2 \qquad \text{Eqn. 3}$$

where $N^c$ is the number of vector paths in the cropped patch and Mf is the number of points on the path i.

Next, $L_1$ loss in RGB space for texture is used, by comparing a crop $I^c$ from the predicted drawing I 338 and a corresponding crop $\hat{I}^c$ from the artist's drawing (input training drawing) $\hat{I}$ 412:

$$L_t = \|I^c - \hat{I}^c\| \qquad \text{Eqn. 4}$$

In addition, an adversarial loss is used to encourage the stylized or textured output patches to be visually similar to random patches from the artist's drawing. To this end, a discriminator D 430 is added during training that is trained in parallel with the stroke texture module 336.

As an aside, discriminator is a type of NN which is configured to learn to distinguish the fake data from realistic fake data, which may have the same characteristics as the training data, and is generated by a generator. The discriminator and the generator compete with each other, and the discriminator penalizes the generator for generating data that is easily recognized as implausible. By using the discriminator and the generator together in such a way in a generative adversarial network (GAN), more realistic and plausible examples are generated by the generator over time.

In some embodiments, the discriminator D has the architecture of a 70×70 PatchGAN (a type of discriminator for GANs) with instance normalization, and employs a standard Least Squares GAN (LSGAN) discriminator loss. In some scenarios, the output patches of the model are taken as fake, and random patches from the artist's drawing mare taken as real. The patches contain stroke pixels are selected (as opposed to blank spaces). The adversarial loss $L_a$ is added to the stroke texture module 336 by encouraging output patches to be classified as real by the discriminator D:

$$L_a = (D(I^c) - 1)^2 \qquad \text{Eqn. 5}$$

Putting the above together, Eqns. 2-5 are used in conjunction for training. More specifically, in some embodiments, each of the surface geometry module 312 and the path geometry module 316 are pre-trained using $\lambda_b L_b + \lambda_s L_s$, and the stroke texture module 336 is pre-trained using $\lambda_t L_t + \lambda_a L_a$. In such embodiments, because the adversarial loss $L_a$ is only applied to the stroke texture module 336, the 2D CNN of the stroke texture module 336 is used as the generator for the discriminator during pre-training. All three modules 312, 316, 336 are then trained end-to-end using the weighted sum of all the above losses. In some implementations, the three modules are trained collectively together rather than separately. For the end-to-end training, the 2D CNNs of the surface geometry module 312 and the stroke texture module 336 as well as the 1D CNN of the path geometry module 316 are used as the generator for the discriminator for the adversarial loss $L_a$. In some implementations, the default values of hyperparameters λ are set to $\lambda_b = 1$; $\lambda_s = 0.02$; $\lambda_t = 1$; $\lambda_a = 1$. Furthermore, the Adam optimizer (a type of optimization algorithm for gradient descent) is used with all three modules 312, 316, 336, with a learning rate set to 0.0002 and a batch size of 16. The learning rate dictates the "step" the gradient descent takes when finding the lowest error.

In some embodiments, each of the surface geometry module 312, path geometry module 316, and stroke texture module 336 have respective initial weight parameters assigned. For example, surface geometry module 312 is initialized with a set of parameters $w_1$ set to predetermined values, path geometry module 316 is initialized with a set of parameters $w_2$ set to predetermined values, and stroke texture module 336 is initialized with a set of parameters $w_3$ set to predetermined values. In some implementations, these predetermined values are randomly initialized from a normal distribution. Specifically, a Xavier Initialization is used to initialize the weights, with a gain of 0.02. The initial weight parameters are modified and determined through iteration through the abovementioned loss functions such that error indicated by, e.g., $L_b$ (for surface geometry module 312 and path geometry module 316) or $L_t$ (for stroke texture module 336) converge to a minimum, or a weight sum of all loss functions converge to a minimum in the case of end-to-end training. The newly determined, updated weight parameters $w_1$, $w_2$, and $w_3$ are provided to respective ones of the modules 312, 316, 336.

Referring briefly back to FIG. 1 with the above context in mind, the system 100 indicates that the training module 110 receives at least data representative of stylized drawing 114, which corresponds to cropped portion $I^c$ from the predicted drawing, and data representative of the artist's drawing 112, which corresponds to a corresponding cropped portion $\hat{I}^c$ from the input training drawing, the error between which is shown by the loss function expressed as Eqn. 4. FIG. 1 also indicates that the training module 110 provides outputs to each of the modules 312, 316, 336. These outputs may include initial or updated weight parameters as discussed above.

The architecture 300 in conjunction with the learning module 410 thus learns to stylize line drawings for 3D models by predicting stroke thickness, displacement, and/or texture. In some embodiments, the model is trainable from a single raster drawing and produces output strokes in a vector graphics format.

Example Results of Training and Training Variations

The above training methodology has been evaluated qualitatively and quantitively, using example 3D shapes collected from existing repositories. Human artists were asked to stylize the 2D plain line drawings of the 3D shapes. Since the model described elsewhere herein is trained with a single image, for each style, one drawing was randomly select as training; others were retained for testing and evaluation.

Example results of the above approach are shown in FIGS. 2A and 2B for qualitative comparison. Referring back to FIG. 2B for example, as shown in the leftmost images 210a and 210b, the model has accurately transferred variations in stroke thickness from the turtle 210a to the dinosaur 210b, giving thicker strokes to low-curvature regions; strokes are also thicker on right-facing parts of the surface. The model has also transferred the charcoal-like stroke texture. In the second example with images 212a and 212b, the model has accurately transferred the thin strokes, with stroke thickness often thicker around convex bulges.

Additionally, an ablation study (i.e., with reduced features or parameters) was performed in which (1) the vector stroke representation was removed (no strokes), (2) raw curve features were removed from the path geometry module 316 (no curve features), (3) the 3D shape features were excluded from the path geometry module 316 (no surface features), (4) during training, instead of randomly choosing a crop size from a set of scales, a fixed crop size of 128×128 was used (no multi-scale crops), and (5) the displacement regularization $L_s$ was removed (no regularization).

Figure 5A:
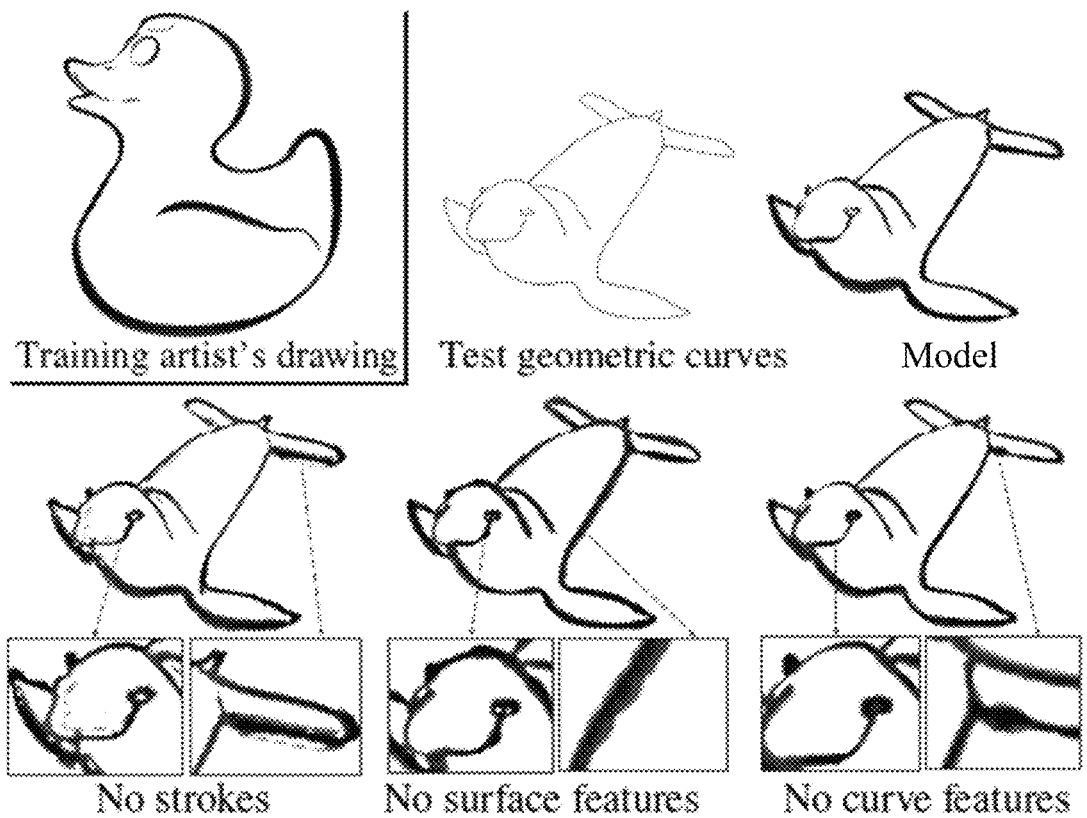
FIG. 5A illustrates characteristic comparisons with reduced variants associated with an ablation study.

In some examples, the reduced variants resulted in degradation and worse performance compared to the model disclosed herein. FIG. 5A illustrates characteristic comparisons with the reduced variants associated with the examples used in the ablation study.

Figure 5B:
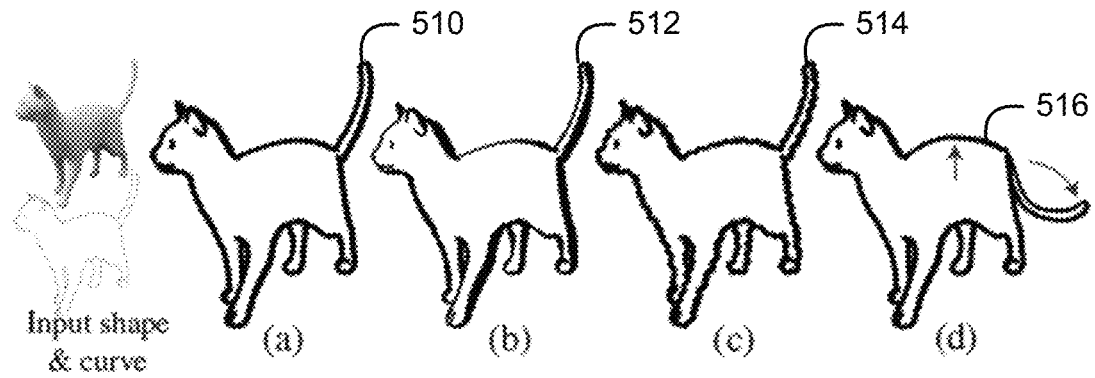
FIG. 5B illustrates three examples of vector editing operations on output strokes from the model disclosed herein.

Additionally, since the model disclosed herein is able to output the stylized drawing in a vector representation, an artist or a user can easily edit the strokes in post-processing or intermediate processing using, e.g., vector graphics editing applications. FIG. 5B illustrates three examples of vector editing operations on output strokes 510 from the model disclosed herein: rescaling thickness 512, adding wiggliness 514, and moving control points 516. Hence, herein lies another advantage of the vectorized outputs of the model described herein.

Methods

Figure 6:
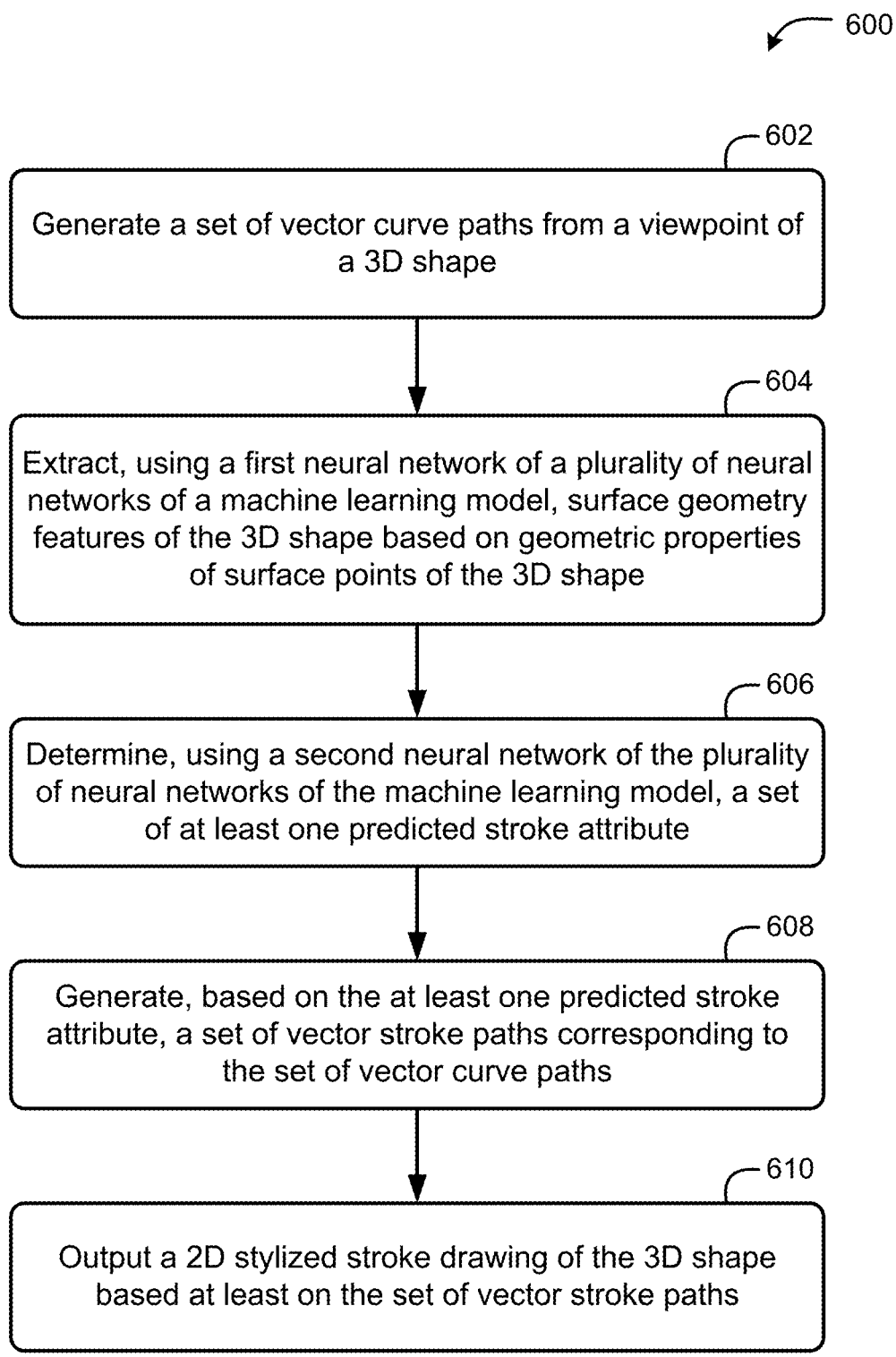
FIG. 6 is a flow diagram illustrating a methodology for generating a stylized image based on a 3D shape.
Figure 8:
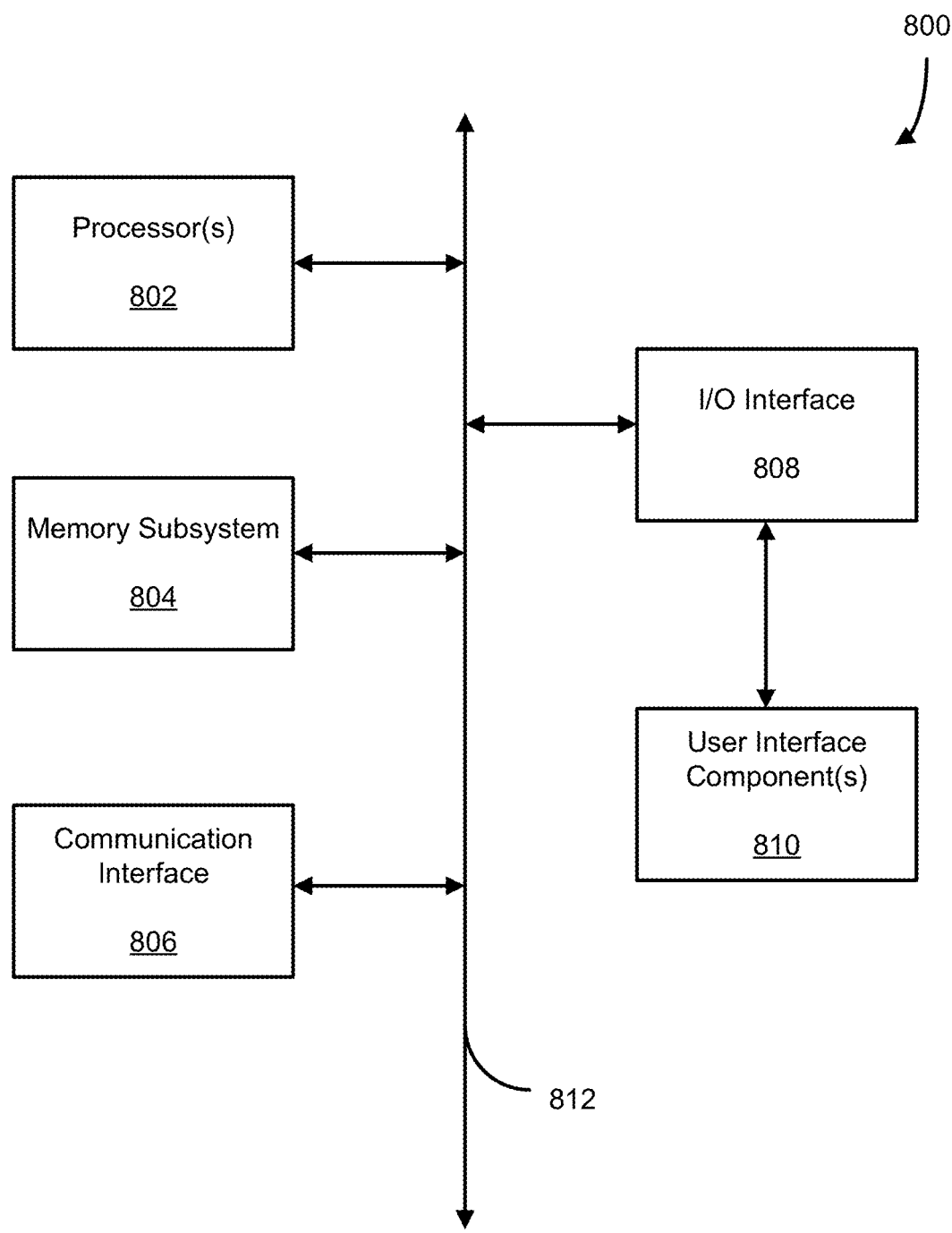
FIG. 8 shows a schematic diagram of an example computing device for implementing the methods, systems, and techniques described herein in accordance with some embodiments.

FIG. 6 is a flow diagram of a method 600 for generating a stylized image based on a 3D shape, in accordance with some embodiments. In some embodiments, the functionality illustrated in one or more of the steps shown in FIG. 6 is performed by hardware and/or software components of a suitable computerized system or apparatus (e.g., a user device (mobile or otherwise), a workstation, a server) configured to operate the various components and modules implementing the architecture of FIG. 3A. Example components of the computerized apparatus are illustrated in FIG. 8, which are described in more detail below.

At step 602, the method 600 includes generating a set of vector curve paths from a viewpoint of a 3D shape. In some embodiments, the 3D shape is an object in physical space, and the viewpoint of the 3D shape is obtained by an image-capturing apparatus, such as a camera. In some implementations, other types of sensors are usable. For example, a radar is usable to detect depths of surface features of the 3D shape. The set of vector curve paths include a set of geometric curves. Geometric curves are plain curves in their "base" form of the 3D shape (e.g., outlines of at least some features of the 3D shape). In some embodiments, the geometric curves are represented as polylines, which are vector paths with densely sampled control points $c_i$ that are ultimately converted into stylized strokes by assigning, e.g., thickness, displacement, and/or texture along these curves. The geometric curves are extracted using an existing algorithm for creating vector line drawings from 3D shapes, e.g., pretrained geometry branch of Neural Contours.

At step 604, the method 600 includes extracting, using a first neural network of a plurality of neural networks of a machine learning model, surface geometry features of the 3D shape based on geometric properties of surface points of the 3D shape. In some embodiments, surface geometry renderings (e.g., surface geometry renderings 306 of FIG. 3A) are captured and concatenated with the geometric curves. These surface geometry renderings include pixels each containing geometric properties of the surface point that projects to that pixel. Such geometric properties include one or more of: (1) object depth from camera, (2) radial curvature, (3) maximum and (4) minimum principal surface curvatures, (5) view-dependent surface curvature, (6) dot product of surface normal with view vector, and (7) a binary image containing the line segments of the vector paths of the geometric curves.

In some embodiments, a surface geometry module (e.g., 312 of FIG. 3A) implements a neural network, such as a 2D CNN, to obtain the surface geometry features. Image data for the surface geometry renderings (including at least some of the seven geometric properties) and geometric curves are inputted to the surface geometry module. The surface geometry module 312 is configured to generate a first set of feature maps V based on the input image data. In some implementations, the set of feature maps is a 768×768×7 set of feature maps, which is then passed through the 2D CNN to output a set of 768×768×40 deep feature maps based on a first set of weight parameters $w_1$ learned from previous training (e.g., from a training module) or provided as an initial set of weights. More specifically, the set of deep feature maps is obtained by the function $F=f(V; w_1)$, where f is, e.g., a ResNet-based fully convolutional network with four residual blocks.

At step 606, the method 600 includes determining, using a second neural network of the plurality of neural networks of the machine learning model, a set of at least one predicted stroke attribute based at least on the surface geometry features and a predetermined drawing style. In some embodiments, predicted stroke attributes includes 1D thickness scalars $t_i$ and/or 2D displacement vectors $d_i$ for each control point along each of the geometric curves. Stroke thickness and displacement predictions depend on image-space geometric shape features, and are applied to control points along the geometric curves so as to simulate the ways that artists deform curves and vary pressure and/or thickness along strokes.

More specifically, in some embodiments, a path geometry module (e.g., 316 of FIG. 3A) include a neural network (e.g., 1D CNN) applied separately to each of the geometric curves 308 using 1D convolutions. The 1D CNN generates predictions for thickness and/or displacement, e.g., according to function h of Eqn. 1, based on (i) raw curve features, which are derived from the geometric curves and include control points along the geometric curves, (ii) deep surface geometry features from the set of deep feature maps generated by the surface geometry module, and (iii) a second set of weight parameters (e.g., $w_2$ learned from previous training by the training module or initialized as default weights).

At step 608, the method 600 includes generating, based on the at least one predicted stroke attribute, a set of vector stroke paths corresponding to the set of vector curve paths. In some embodiments, a differentiable vector renderer (e.g., 320 of FIG. 3A) generates an untextured drawing based on the predicted thickness and/or displacement. More specifically, corresponding predicted thickness and/or corresponding displacement are applied to each control point of the set of vector curve paths. The new vector paths used to render the raster drawing is represented by $c'_i = c_i + d_i$ as shown in FIG. 3B. The new vector paths are also modified based on 1D predicted thickness $t_i$, where an extension associated with a control point is expanded to a length dictated by the per-point thickness $t_i$. In some embodiments, the differentiable vector renderer rasterizes the new vector paths to generate an untextured raster image, e.g., in grayscale.

At step 610, the method 600 includes outputting, using a third neural network of the plurality of neural networks of the machine learning model, a 2D stylized stroke drawing of the 3D shape based at least on the set of vector stroke paths. In some embodiments, a stroke texture module (e.g., 336 of FIG. 3A) generates a third set of feature maps U based on the raster image, and the set of first feature maps V. This set of feature maps is translated into a textured image based on a third set of weight parameters (e.g., $w_3$ learned from previous training by the training module or initialized as default weights), e.g., according to a function g, which is implemented as a ResNet-based fully convolutional network with four residual blocks.

At least some portions of the steps described above for method 600 are performed in different orders in different embodiments (e.g., geometric curves are extracted before surface geometry renderings are captured). At least some portions of the steps are performed substantially concurrently in some embodiments (e.g., acquisition of geometric curves and surface geometry renderings are performed or initiated at the same time). It is also noted that in some embodiments, not every step are required.

Figure 7:
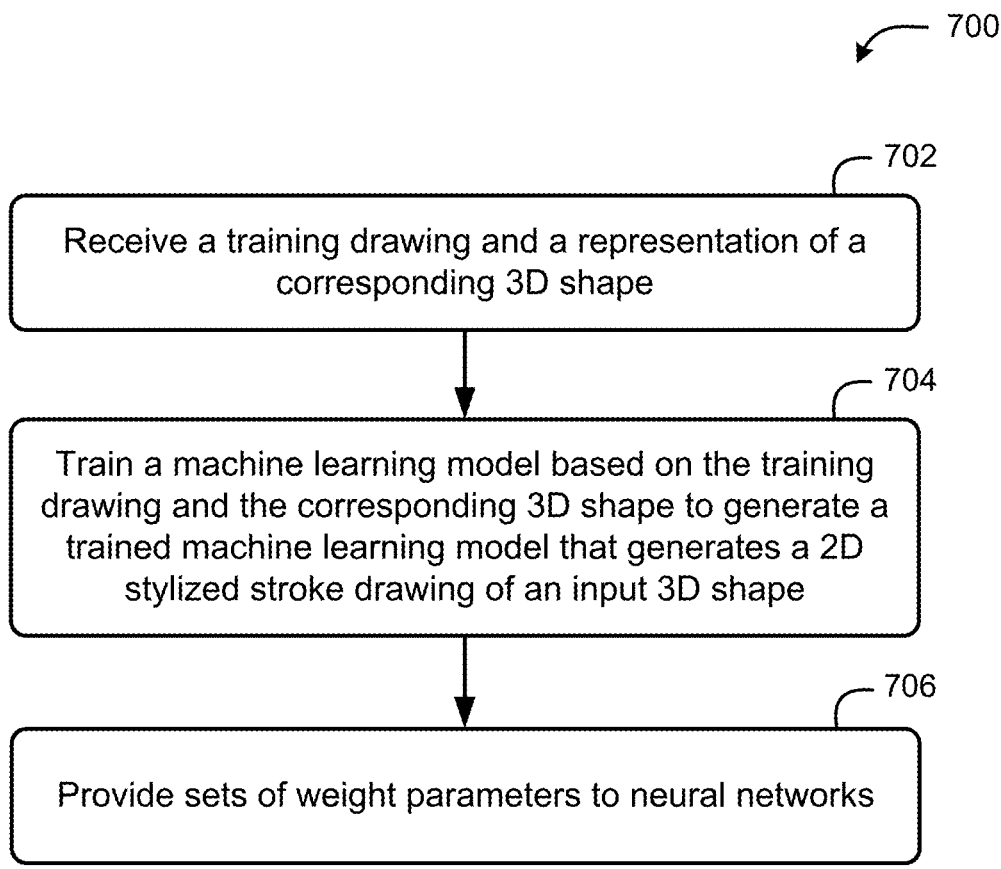
FIG. 7 is a flow diagram illustrating a methodology for training a plurality of neural networks for stylized image generation.

FIG. 7 is a flow diagram of a method 700 for training a plurality of neural networks for stylized image generation, in accordance with some embodiments and usable in conjunction with the architecture (e.g., 300) and the image generation methodology (e.g., 600) disclosed herein. In some embodiments, the functionality illustrated in one or more of the steps shown in FIG. 7 are performed by hardware and/or software components of a suitable computerized system or apparatus (e.g., a training module 400, or a user device (mobile or otherwise), a workstation, or a server operating the training module 400) configured to operate the various components and modules implementing the methodology 700. Example components of the computerized apparatus are illustrated in FIG. 4, which are described in more detail above.

At step 702, the method 700 includes receiving an input training drawing and a representation of a corresponding training 3D shape. The training 3D shape is an object in physical space. In some embodiments, the input training drawing is a single training example drawn by an artist (a human who is shown the training 3D shape, or a 2D representation such as line drawings or photographs of the training 3D shape, and draws the shape on a suitable medium such as a drawing tablet with stylus).

In some embodiments, the input training drawing uses such a single training example to minimize inconsistencies in style across multiple drawings. Random patches of the input training drawing are used as multiple training instances. A crop size c is selected such that the patches have a resolution of, e.g., 64×64, 128×128, 192×192, 256×256. In some implementations, only those of the patches that include strokes are used for training.

It is noted that in various other embodiments, more than one drawing are allowed to be used as input, and patches need not be limited to those that include strokes therein (e.g., the training instances include blank patches).

In step 704, the method 700 includes training the machine learning model based on the input training drawing and the training 3D shape to generate a trained machine learning model that generates a 2D stylized stroke drawing of an input 3D shape based at least on a style of the training drawing and surface geometry features of the input 3D shape. The training involves optimizing the sets of weight parameters configured to be used by respective ones of the plurality of neural networks according to the style of the input training drawing. In some embodiments, the training includes performing one or more iterations of minimizing one or more loss functions to optimize (i.e., minimize errors in) weight parameters $w = \{w_1, w_2, w_3\}$ to be used with the surface geometry module (e.g., 312 of FIG. 3A), path geometry module (e.g., 316 of FIG. 3A), and stroke texture module (e.g., 336 of FIG. 3A). These three modules are collectively configured to generate a 2D stylized stroke drawing of the 3D shape, as discussed with respect to FIGS. 3A and 6. In some implementations, up to four loss terms are used in the loss functions: $L_b$, $L_s$, $L_t$, and $L_a$ as expressed above in Eqns. 2-5. As discussed elsewhere herein, performing the one or more loss functions may include (i) obtaining a binary mask ($\hat{I}_b$) of the input training drawing, and cropped portions thereof ($\hat{I}_b^c$), (ii) an untextured image ($I_b$) generated by the machine learning model, and cropped portions thereof ($I_b^c$), and/or (iii) a textured image comprising the 2D stylized stroke drawing (I) of the 3D shape, and cropped portions thereof ($I^c$). In some embodiments, a discriminator D (e.g., 430 of FIG. 4) is implemented in a GAN (e.g., PatchGAN) to encourage the output patches to be visually similar to random patches from the artist's drawing.

Given the loss terms above, in some embodiments, each of the surface geometry module and the path geometry module is pre-trained using $\lambda_b L_b + \lambda_s L_s$, and the stroke texture module is pre-trained using $\lambda_t L_t + \lambda_a L_a$. Parameters $\lambda$ may be selected to suitable values; example default values may be $\lambda_b = 1$; $\lambda_s = 0.02$; $\lambda_t = 1$; $\lambda_a = 1$.

In some embodiments, first, second, and third sets of weight parameters $w_1$, $w_2$, $w_3$ are initialized to predetermined value(s) in the surface geometry module, path geometry module, and stroke texture module, respectively. Through iterative training via minimizing the loss functions, updated weight parameters $w_1$, $w_2$, $w_3$ are provided to the respective modules.

At step 706, the method 700 includes providing the sets of weight parameters to the plurality of neural networks. In some embodiments, the first set of weight parameters ($w_1$) are provided to the surface geometry module, the second set of weight parameters ($w_2$) are provided to the path geometry module, and the third set of weight parameters ($w_3$) are provided to the stroke texture module.

In the above description, a module may refer to a portion of computer-executable instructions. In some embodiments, a module is implemented by a hardware processor configured to execute the corresponding computer-executable instructions. A hardware processor is an integrated circuit device associated with a computing device, such as a server or a user device (e.g., a desktop computer, a laptop computer, a tablet computer, a mobile phone, or the like), which is programmable to perform specific tasks. In some embodiments, multiple modules are implemented as a single module. In some embodiments, a single module is implemented as multiple modules. In some embodiments, two or more modules are executable by the same device (e.g., the same server, the same computing device).

Apparatus

FIG. 8 shows a schematic diagram of components of a computing device 800 that is implemented in a computing system in accordance with some implementations. As illustrated, computing device 800 includes a bus 812 that directly or indirectly couples one or more processors(s) 802, a memory subsystem 804, a communication interface 806, an input/output (I/O) interface 808, and/or one or more user interface components 810. It should be noted that, in some embodiments, various other components are included in a computing device that are not shown in FIG. 8, and/or one or more components shown in FIG. 8 are omitted.

In some embodiments, computing device 800 includes or is coupled to a memory subsystem 804. Memory subsystem 804 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 804 also includes one or more hardware devices such as a solid-state memory, one or more hard drives, one or more optical disk drives, or the like. In some embodiments, memory subsystem 804 stores content files such as text-based files, audio files, image files, and/or video files, etc. In some implementations, the content files include documents, pictures, photos, songs, podcasts, movies, etc. In some embodiments, memory subsystem 804 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 802, or processor(s) of another computing device communicatively coupled to computing device 800) to perform various operations or functions such as those described with reference to FIGS. 6 and 7. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 800 (or a computing system that includes computing device 800). Furthermore, in some implementations, computing device 800 (or a computing system include computing device 800) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 806 is used by computing device 800 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 806 utilizes various drivers, wireless communication circuitry, network interface circuitry, or the like to enable communication via various communication networks.

I/O interface 808 includes various drivers and/or hardware circuitry for receiving input from various input devices, providing output to various output devices, or exchanging input/output with various input/output devices. Examples of devices coupled to I/O interface 808 include peripheral devices such as a printer, a docking station, a communication hub, a charging device, etc. In some implementations, some devices coupled to I/O interface 808 are used as user interface component(s) 810. In one example, a user operates input elements of user interface component(s) 810 to invoke the functionality of computing device 800 and/or of another device communicatively coupled to computing device 800; a user views, hears, and/or otherwise experiences output from computing device 800 via output elements of user interface component(s) 810. Some user interface component(s) 810 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, or C" and "at least one of A, B, and C" should each be understood to mean {A}, {B}, {C}, {A, B}, {A, C}, {B, C}, or {A, B, C}.

What is claimed is:

1. A computer-implemented method comprising:
    receiving a training drawing and a representation of a corresponding training three-dimensional (3D) shape into a machine learning model; and
    training the machine learning model based on the training drawing and the corresponding training 3D shape to generate a trained machine learning model that generates a two-dimensional (2D) stylized stroke drawing of an input 3D shape based at least on a style of the training drawing and surface geometry features of the input 3D shape.

2. The computer-implemented method of claim 1, wherein training the machine learning model includes:
    generating a binary mask of the training drawing;
    using the machine learning model to generate an untextured image based on the training 3D shape;
    using the machine learning model to generate a textured image based on the untextured image; and
    applying a loss function comprising a plurality of loss terms including:
        a first loss term that compares portions of the untextured image with portions of the binary mask; and
        a second loss term that compares portions of the textured image with portions of the training drawing.

3. The computer-implemented method of claim 2, wherein the plurality of loss terms further includes a third loss term comprising a shape regularization term on predicted displacements used to generate the untextured image.

4. The computer-implemented method of claim 3, wherein the plurality of loss terms further includes a fourth loss term comprising an adversarial loss associated with a discriminator.

5. The computer-implemented method of claim 4, wherein the machine learning model includes three neural networks that are trained collectively using a weighted sum of the first loss term, the second loss term, the third loss term, and the fourth loss term.

6. The computer-implemented method of claim 2, wherein the untextured image includes a rasterized image, and the textured image includes a predicted stylized image in RGB (red, green, blue) space.

7. The computer-implemented method of claim 2, further comprising:
    determining a plurality of crop sizes; and
    generating the portions of the training drawing, the portions of the binary mask, the portions of the untextured image, and the portions of the textured image according to the plurality of crop sizes.

8. The computer-implemented method of claim 1, wherein the machine learning model is trained using a single training drawing.

9. The computer-implemented method of claim 1, wherein the generated trained machine learning model is configured to:
    generate a set of vector curve paths from a viewpoint of a three-dimensional (3D) shape;
    extract, using a first neural network of a plurality of neural networks associated with the trained machine learning model, surface geometry features of the 3D shape based on geometric properties of surface points of the 3D shape;
    determine, using a second neural network of the plurality of neural networks, a set of at least one predicted stroke attribute based at least on the surface geometry features and a predetermined drawing style;
    generate, based on the at least one predicted stroke attribute, a set of vector stroke paths corresponding to the set of vector curve paths; and
    output a two-dimensional (2D) stylized stroke drawing of the 3D shape based at least on the set of vector stroke paths.

10. A non-transitory computer-readable medium storing instructions configured to, when executed by one or more processors, cause the one or more processors to perform operations including:
    receiving a training drawing and a representation of a corresponding training three-dimensional (3D) shape into a machine learning model; and
    training the machine learning model based on the training drawing and the corresponding training 3D shape to generate a trained machine learning model that generates a two-dimensional (2D) stylized stroke drawing of an input 3D shape based at least on a style of the training drawing and surface geometry features of the input 3D shape.

11. The non-transitory computer-readable medium of claim 10, wherein training the machine learning model includes:
    generating a binary mask of the training drawing;
    using the machine learning model to generate an untextured image based on the training 3D shape;
    using the machine learning model to generate a textured image based on the untextured image; and applying a loss function comprising a plurality of loss terms including:
a first loss term that compares portions of the untextured image with portions of the binary mask; and
a second loss term that compares portions of the textured image with portions of the training drawing.

12. The non-transitory computer-readable medium of claim 11, wherein the plurality of loss terms further includes a third loss term comprising a shape regularization term on predicted displacements used to generate the untextured image.

13. The non-transitory computer-readable medium of claim 12, wherein the plurality of loss terms further includes a fourth loss term comprising an adversarial loss associated with a discriminator.

14. The non-transitory computer-readable medium of claim 13, wherein the machine learning model includes three neural networks that are trained collectively using a weighted sum of the first loss term, the second loss term, the third loss term, and the fourth loss term.

15. The non-transitory computer-readable medium of claim 11, further comprising:
determining a plurality of crop sizes; and
generating the portions of the training drawing, the portions of the binary mask, the portions of the untextured image, and the portions of the textured image according to the plurality of crop sizes.

16. The non-transitory computer-readable medium of claim 10, wherein the machine learning model is trained using a single training drawing.

17. The non-transitory computer-readable medium of claim 10, wherein the generated trained machine learning model is configured to:
generate a set of vector curve paths from a viewpoint of a three-dimensional (3D) shape;
extract, using a first neural network of a plurality of neural networks associated with the trained machine learning model, surface geometry features of the 3D shape based on geometric properties of surface points of the 3D shape;
determine, using a second neural network of the plurality of neural networks, a set of at least one predicted stroke attribute based at least on the surface geometry features and a predetermined drawing style;
generate, based on the at least one predicted stroke attribute, a set of vector stroke paths corresponding to the set of vector curve paths; and
output a two-dimensional (2D) stylized stroke drawing of the 3D shape based at least on the set of vector stroke paths.

18. A system comprising:
one or more processors; and
one or more memory components storing instructions configured to, when executed by the one or more processors, cause the one or more processors to perform operations including:
receiving a training drawing and a representation of a corresponding training three-dimensional (3D) shape into a machine learning model; and
training the machine learning model based on the training drawing and the corresponding training 3D shape to generate a trained machine learning model that generates a two-dimensional (2D) stylized stroke drawing of an input 3D shape based at least on a style of the training drawing and surface geometry features of the input 3D shape;
wherein the generated trained machine learning model is configured to receive a 3D shape and output a 2D stylized stroke drawing of the 3D shape.

19. The system of claim 18, wherein the generated trained machine learning model is configured to output the 2D stylized stroke drawing of the 3D shape by:
generating a set of vector curve paths from a viewpoint of the 3D shape;
extracting surface geometry features of the 3D shape based on geometric properties of surface points of the 3D shape;
determining a set of at least one predicted stroke attribute based at least on the surface geometry features and a predetermined drawing style;
generating, based on the at least one predicted stroke attribute, a set of vector stroke paths corresponding to the set of vector curve paths; and
outputting the 2D stylized stroke drawing of the 3D shape based at least on the set of vector stroke paths.

20. The system of claim 18, wherein the training the machine learning model includes:
generating a binary mask of the training drawing;
using the machine learning model to generate an untextured image based on the training 3D shape;
using the machine learning model to generate a textured image based on the untextured image; and
applying a loss function comprising a plurality of loss terms including:
a first loss term that compares portions of the untextured image with portions of the binary mask; and
a second loss term that compares portions of the textured image with portions of the training drawing.

* * * * *